(12) United States Patent
Terry

(10) Patent No.: US 9,641,372 B2
(45) Date of Patent: *May 2, 2017

(54) SYSTEM AND METHOD FOR CONTROLLING COMBINED RADIO SIGNALS

(71) Applicant: PlusN, LLC, Elmsford, NY (US)

(72) Inventor: John David Terry, Annandale, VA (US)

(73) Assignee: Plusn LLC, Elmsford, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/879,557

(22) Filed: Oct. 9, 2015

(65) Prior Publication Data

US 2016/0036612 A1     Feb. 4, 2016

Related U.S. Application Data

(63) Continuation of application No. 14/071,697, filed on Nov. 5, 2013, now Pat. No. 9,160,593, which is a
(Continued)

(51) Int. Cl.
*H04L 27/26* (2006.01)
*H04L 5/00* (2006.01)

(52) U.S. Cl.
CPC ........ *H04L 27/2614* (2013.01); *H04L 5/0007* (2013.01); *H04L 27/2615* (2013.01); *H04L 27/2626* (2013.01)

(58) Field of Classification Search
CPC .............. H04L 27/2614; H04L 5/0007; H04L 27/2615; H04L 27/2626
See application file for complete search history.

(56) References Cited

U.S. PATENT DOCUMENTS 5,302,914 A   4/1994  Arntz et al.
5,557,612 A   9/1996  Bingham
(Continued)

FOREIGN PATENT DOCUMENTS

EP   1838062   9/2007
GB   2428168   1/2007
(Continued)

OTHER PUBLICATIONS

Yicai et al, "An Effective Low-Complexity Method for PAPR Reduction in OFDM-based Systems", Mar. 31, 2009-Apr. 2, 2009, IEEE, pp. 176-180.*
(Continued)

*Primary Examiner* — Sophia Vlahos
(74) *Attorney, Agent, or Firm* — Steven M. Hoffberg, Esq.; Ostrolenk Faber LLP

(57) ABSTRACT

A method for controlling a combined waveform, representing a combination of at least two signals having orthogonal frequency multiplexed signal components, comprising: receiving information defining the at least two signals; transforming the information defining each signal to a representation having orthogonal frequency multiplexed signal components, such that at least one signal has at least two alternate representations of the same information, and combining the transformed information using the at least two alternate representations, in at least two different ways, to define respectively different combinations; analyzing the respectively different combinations with respect to at least one criterion; and outputting a respective combined waveform or information defining the waveform, representing a selected combination of the transformed information from each of the at least two signals selected based on the analysis.

20 Claims, 9 Drawing Sheets

Related U.S. Application Data continuation of application No. 12/824,608, filed on Jun. 28, 2010, now Pat. No. 8,582,687.

(60) Provisional application No. 61/220,802, filed on Jun. 26, 2009, provisional application No. 61/221,190, filed on Jun. 29, 2009.

(56) References Cited

U.S. PATENT DOCUMENTS

| | | | |
|---|---|---|---|
| 6,925,128 | B2 | 8/2005 | Corral |
| 7,002,904 | B2 | 2/2006 | Jung |
| 7,072,411 | B1 | 7/2006 | Dollard |
| 7,292,639 | B1 | 11/2007 | Demirekler et al. |
| 7,301,891 | B2 | 11/2007 | Park et al. |
| 7,313,199 | B2 | 12/2007 | Gupta et al. |
| 7,315,580 | B2 | 1/2008 | Feng et al. |
| 7,321,629 | B2 | 1/2008 | Feng et al. |
| 7,339,884 | B2 | 3/2008 | Bar-Ness et al. |
| 7,340,006 | B2 | 3/2008 | Yun et al. |
| 7,342,978 | B2 | 3/2008 | Feng et al. |
| 7,345,990 | B2 | 3/2008 | Son |
| 7,349,817 | B2 | 3/2008 | Cha |
| 7,376,074 | B2 | 5/2008 | Jung et al. |
| 7,376,202 | B2 | 5/2008 | Bar-Ness et al. |
| 7,391,713 | B2 | 6/2008 | Anvari |
| 7,443,904 | B2 | 10/2008 | Choi et al. |
| 7,463,698 | B2 | 12/2008 | Fujii et al. |
| 7,467,338 | B2 * | 12/2008 | Saul ............ H04L 27/2624 375/350 |
| 7,496,028 | B2 | 2/2009 | Jung et al. |
| 7,499,496 | B2 | 3/2009 | Fujii et al. |
| 7,535,950 | B2 | 5/2009 | Chen et al. |
| 7,953,174 | B2 | 5/2011 | Asbeck et al. |
| 7,961,591 | B2 | 6/2011 | Abedi |
| 8,009,764 | B2 | 8/2011 | Kwon et al. |
| 8,027,398 | B2 | 9/2011 | Lin et al. |
| 8,111,778 | B2 | 2/2012 | Yano et al. |
| 8,145,066 | B2 | 3/2012 | Painchaud et al. |
| 8,208,567 | B2 | 6/2012 | Yeon et al. |
| 8,582,687 | B2 | 11/2013 | Terry |
| 9,160,593 | B2 | 10/2015 | Terry |
| 2005/0073360 | A1 | 4/2005 | Johnson et al. |
| 2005/0089109 | A1 | 4/2005 | Yun et al. |
| 2005/0089116 | A1 | 4/2005 | Moffatt et al. |
| 2005/0100108 | A1 | 5/2005 | Yun et al. |
| 2005/0238110 | A1 | 10/2005 | Yun et al. |
| 2005/0265468 | A1 | 12/2005 | Fujii et al. |
| 2005/0265479 | A1 | 12/2005 | Fujii et al. |
| 2005/0270968 | A1 | 12/2005 | Feng et al. |
| 2005/0286648 | A1 | 12/2005 | Feng et al. |
| 2006/0039498 | A1 | 2/2006 | de Figueiredo et al. |
| 2006/0078066 | A1 | 4/2006 | Yun et al. |
| 2006/0098747 | A1 | 5/2006 | Yue et al. |
| 2006/0115010 | A1 | 6/2006 | Rog et al. |
| 2006/0120268 | A1 | 6/2006 | Bar-Ness et al. |
| 2006/0120269 | A1 | 6/2006 | Kim et al. |
| 2006/0126748 | A1 | 6/2006 | Lin et al. |
| 2006/0215732 | A1 | 9/2006 | Chen et al. |
| 2006/0245346 | A1 | 11/2006 | Bar-Ness et al. |
| 2006/0247898 | A1 | 11/2006 | Cha |
| 2006/0268672 | A1 | 11/2006 | Sari |
| 2007/0019537 | A1 | 1/2007 | Paulraj |
| 2007/0076588 | A1 | 4/2007 | Alapuranen |
| 2007/0089015 | A1 | 4/2007 | Saul |
| 2007/0092017 | A1 | 4/2007 | Abedi |
| 2007/0098094 | A1 | 5/2007 | Yue et al. |
| 2007/0121483 | A1 | 5/2007 | Zhang et al. |
| 2007/0140367 | A1 | 6/2007 | Braithwaite |
| 2007/0189334 | A1 | 8/2007 | Awad |
| 2007/0217329 | A1 | 9/2007 | Abedi |
| 2007/0223365 | A1 | 9/2007 | Tsfaty et al. |
| 2007/0291860 | A1 | 12/2007 | Wang et al. |
| 2008/0008084 | A1 | 1/2008 | Son |
| 2008/0049602 | A1 | 2/2008 | Jung et al. |
| 2008/0095252 | A1 | 4/2008 | Kim et al. |
| 2008/0112496 | A1 | 5/2008 | Devlin et al. |
| 2008/0215655 | A1 | 9/2008 | Negre et al. |
| 2008/0232235 | A1 | 9/2008 | Kowalski et al. |
| 2008/0267312 | A1 | 10/2008 | Yokoyama |
| 2008/0285432 | A1 | 11/2008 | Ueng et al. |
| 2008/0285673 | A1 | 11/2008 | Han et al. |
| 2008/0298490 | A1 | 12/2008 | Yun et al. |
| 2008/0310383 | A1 | 12/2008 | Kowalski |
| 2009/0003308 | A1 | 1/2009 | Baxley et al. |
| 2009/0011722 | A1 | 1/2009 | Kleider et al. |
| 2009/0016464 | A1 | 1/2009 | Zheng et al. |
| 2009/0034407 | A1 | 2/2009 | Lindh |
| 2009/0046702 | A1 | 2/2009 | Luo et al. |
| 2009/0052561 | A1 | 2/2009 | Baxley et al. |
| 2009/0052577 | A1 | 2/2009 | Wang |
| 2009/0060070 | A1 | 3/2009 | Hayase et al. |
| 2009/0060073 | A1 | 3/2009 | Yano et al. |
| 2009/0067318 | A1 | 3/2009 | Kowalski |
| 2009/0074093 | A1 | 3/2009 | Han et al. |
| 2009/0080500 | A1 | 3/2009 | Muharemovic et al. |
| 2009/0086848 | A1 | 4/2009 | Han et al. |
| 2009/0097579 | A1 | 4/2009 | Yeon et al. |
| 2009/0110033 | A1 | 4/2009 | Shattil |
| 2009/0110034 | A1 | 4/2009 | Kowalski |
| 2009/0135949 | A1 | 5/2009 | Yu |
| 2009/0147870 | A1 | 6/2009 | Lin et al. |
| 2009/0238064 | A1 | 9/2009 | Lee et al. |
| 2009/0303868 | A1 | 12/2009 | Kimura |
| 2010/0002800 | A1 | 1/2010 | Kim et al. |
| 2010/0124294 | A1 | 5/2010 | Birru et al. |
| 2010/0142475 | A1 | 6/2010 | Kim et al. |

FOREIGN PATENT DOCUMENTS

| | | |
|---|---|---|
| WO | WO2007055518 | 5/2007 |
| WO | WO2012030319 | 3/2012 |
| WO | WO2012162655 | 11/2012 |
| WO | WO2013005214 | 1/2013 |

OTHER PUBLICATIONS

PCT Search Report dated Feb. 27, 2015 (13 pages).
"Peak-to-average power ratio (PAPR)", Wireless Information Transmission System Lab., Mar. 2, 2006.
Abouda et al, PAPR Reduction of OFDM Signal Using Turbo Coding and Selective Mapping, Finland, Jun. 9-11, 2004.
Ahirwar et al, Tradeoff Between PAPR Reduction and Decoding Complexity in Transformed OFDM Systems, IEEE 2005.
Akhtman et al, Peak-to-Average Power Ratio Reduction for OFDM Modems, IEEE 2003.
Alavi et al, PAPR Reduction of OFDM Signals Using Partial Transmit Sequence: An Optimal Approach Using Sphere Decoding, IEEE Communications Letters, vol. 9, No. 11, Nov. 2005.
Alharbi, et al., "A combined SLM and closed-loop QO-STBC for PAPR mitigation in MIMO-OFDM transmission". www.eurasip.org/proceedings/Eusipco/Eusipco2008/papers/1569102063 2008.
Al-Kebsi, et al., "Throughput enhancement and performance improvement of the OFDM based WLAN system", IJCSNS International Journal of Computer Science and Network Security, vol. 9, No. 4, Apr. 2009.
Andgart, et al., "Designing Tone Reservation PAR reduction", EURASIP Journal on applied Signal Processing, vol. 2006, article ID 38237, pp. 1-14.
Armstrong, New OFDM Peak-to-Average Power Reduction Scheme, Australia, 2001.
Baxley, "Analyzing selected mapping for peak-to-average power reduction in OFDM", Thesis, School of Electrical and Computer Engineering, Georgia Institute of Technology, May 2005.
Baxley, et al., "Assessing peak-to-average power ratios for communications applications", Proc. IEEE Military Communications Conf (MILCOM 2004).
Baxley, et al., "Ordered phase sequence testing in SLM for improved blind detection", Proc. 2005 IEEE Conf on Signal Processing Advances in Wireless Communication.

(56) References Cited

OTHER PUBLICATIONS

Behravan et al, PAPR and Other Measures for OFDM Systems with Nonlinearity, Gothenburg, Sweden, 2002.
Behravan, et al., "Iterative estimation and cancellation of nonlinear distortion in OFDM systems", www.mantracom.com/downloads Jun. 19, 2008.
Boccardi, et al., "The p-sphere encoder: vector precoding with low peak-power for the MIMO Gaussian Broadcast Channel", IEEE Trans. Comm., vol. 54, p. 1703, Sep. 2006.
Bonaccorso, et al., "Reducing the peak to average power ratio in OFDM systems", Dix-septieme colloque GRETSI, Vannes, Sep. 13-17, 1999.
Boonsrimuang et al, PAPR Reduction Method for OFDM Signal by Using Dummy Sub-carriers, Proceedings of World Academy of Science, Engineering and Technology, vol. 12, Mar. 2006.
Boonsrimuang, et al., "Mitigation of non-linear distortion using PTS and IDAR method for multi-level QAM-OFDM system", ECTI Transactions on Computer and Information Technology, vol. 1, No. 2, Nov. 2005.
Breiling, et al., "Distortionless reduction of peak power without explicit side information", 2000 IEEE Global Telecommunications Conference.
Breiling, et al., "SLM peak-power reduction without explicit side information", IEEE Communications Letters, vol. 5, No. 6, Jun. 2001.
Chen et al, A Superimposed Periodic Pilot Scheme for Semi-Blind Channel Estimation of OFDM Systems, IEEE, 2002.
Chen et al, Combined Selective Mapping and Binary Cyclic Codes for PAPR Reduction in OFDM Systems, IEEE Transactions on Wireless Communications, vol. 6, No. 10, Oct. 2007.
Chen et al, Iterative Estimation and Cancellation of Clipping Noise for OFDM Signals, IEEE Communications Letters, vol. 7, No. 7, Jul. 2003.
Chen, et al., "A modified selective mapping with PAPR reduction and error correction in OFDM systems", 2007 IEEE Wireless Com. and Networking Conf., pp. 1329-1333.
Cho, et al, Selected Mapping Technique with Novel Phase Sequences for PAPR Reduction of an OFDM Signal, IEEE 2004.
Choi, et al., "Peak power reduction scheme based on subcarrier scrambling for MC-CDMA systems", IEE Proceedings on Communications, vol. 151, pp. 39-43, Feb. 2004.
Cimini, L. J, and N. R. Sollenberger, "Peak-to-Average Power Ratio Reduction of an OFDM Signal Using Partial Transmit Sequences", IEEE Commun Lett., vol. 4, No. 3, pp. 86-88, Mar. 2000).
Ciochina, et al., An analysis of OFDM peak power reduction techniques for WiMAX systems, Proc. 2006 Int. Conf on Communications, pp. 4676-4681.
Daoud, O., et al., "PAPR Reduction by Linear Coding Techniques for MIMO-OFDM Systems Performance Improvement: Simulation and Hardware Implementation", European Journal of Scientific Research, vol. 36 No. 3 (2009), pp. 376-393.
De Figueiredo, "Adaptive pre-distorters for linearization of high power amplifiers in OFDM wireless communications", IEEE North Jersey Section CASS/EDS Chapter, Distinguished lecture.
Debailllie et al, Energy-Scalable OFDM Transmitter Design and Control, San Francisco, CA Jul. 24-28, 2006.
Deng et al, Recursive Clipping and Filtering with Bounded Distortion for PAPR Reduction, IEEE Transactions on Communications, vol. 55, No. 1, Jan. 2007.
Deng, et al., "OFDM PAPR reduction using clipping with distortion control", Proc. 2005 IEEE Conf. on Communications.
Deumal, et al., "Peak reduction of multi-carrier systems by controlled spectral outgrowth", Proc. IEEE Intl. Conf. on Acoustics, Speech and Signal Processing (ICASSP), 2006.
Devlin, et al., "Gaussian pulse based tone reservation for reducing PAPR of OFDM signals", 2007 IEEE Vehicular Technol. Conf.
Dieter Van Welden et al, Clipping Versus Symbol Switching for PAPR Reduction in Coded OFDM, Belgium, 2008.
Fischer, "Peak-to-average power ratio (PAR) reduction in OFDM based on lattice decoding", Proc. Int. OFDM Workshop.
Fischer, "Widely-linear selected mapping for peak-to-average power ratio reduction in OFDM", Electronics Letters, vol. 43, 2007.
Fischer, et al., "Directed selected mapping for peak-to-average power ratio reduction in MIMO OFDM", Proc. International OFDM Workshop, 2007.
Fischer, et al., "Peak-to-average power ratio reduction in MIMO OFDM", Proc. 2007 Int. Conf on Communications, pp. 762-767.
Fischer, et al., "Peak-to-average power ratio reduction in single- and multi-antenna OFDM via directed selected mapping", Jul. 19, 2007.
Fischer, et al., "Signal shaping for peak-power and dynamics reduction in transmission schemes employing precoding", IEEE Trans. on Comm , v50, pp. 735-741, May 2002.
Giannopoulos, et al., "Novel efficient weighting factors for PTS-based PAPR reduction in low-power OFDM transmitters",www.eurasip.org/proceedings/Eusipco/Eusipco2006/papers/1568-982220 2006.
Giannopoulos, et al., "Relationship among BER, power consumption and PAPR", 2008 IEEE Int. Symp on Wireless Pervasive Computing, pp. 633-637.
Goebel et al, On the Effect of FWM in Coherent Optical OFDM Systems, Munich, Germany, 2008.
Gregorio, Analysis and Compensation of Nonlinear Power Amplifier Effects in Multi-Antenna OFDM Systems, Helsinki, Finland 2007.
Guel et al, Clipping formulated as an adding signal technique for OFDM Peak Power Reduction, France, Sep. 2009.
Guel, et al., "Approximation of the average power variation for geometric adding signal approach of PAPR reduction in context of OFDM signals", Union Radio Scientifique Internationale—URSI, Aug. 7-16, 2008, Chicago, IL.
Habendorf, et al., "Nonlinear predistortion with reduced peak-to-average power ratio", Proc. International Symposium on Wireless Communications.
Haider, "Peak to average ratio reduction in wireless OFDM communication systems", Thesis, Blekinge Institute of Technology, Jan. 2006.
Han et al, An Overview of Peak-to-Average Power Ratio Reduction Techniques for Multicarrier Transmission, IEEE Wire Communications, Apr. 2005.
Han et al, Peak-to-Average Power Ratio Reduction of an OFDM Signal by Signal Set Expansion, Korea, 2004.
Handali et al, On Channel Capacity of OFDM with SLM Method for PAPR Reduction, Israel, 2006.
Henkel, et al., "Partial transmit sequences and trellis shaping", Proc. 5th Int. ITC Conf. on Source and Channel Coding, 2004.
Henkel, et al., Another application for trellis shaping: PAR reduction for DMT (OFDM), IEEE Transactions on Communications, vol. 48, No. 9, Sep. 2000.
Herraiz, "Multicarrier communication systems with low sensitivity to nonlinear amplification", Theses, Enginyeria i Arquitectura La Salle, Universitat Ramon Llull, Barcelona 2008.
Hill, G. R., Faulkner, and J. Singh, "Deducing the Peak-to-Average Power Ratio in OFDM by Cyclically Shifting Partial Transmit Sequences", Electronics Letters, vol. 36, No. 6, Mar. 16, 2000).
Hill, G., and M. Faulkner, "Cyclic Shifting and Time Inversion of Partial Transmit Sequences to Reduce the Peak-to-Average Ratio in OFDM", PIMRC 2000, vol. 2, pp. 1256-1259, Sep. 2000).
Ho et al, Iterative Detection for Pretransformed OFDM by Subcarrier Reconstruction, IEEE Transactions on Signal Processing, vol. 53, No. 8, Aug. 2005.
Hosseini, et al., "PAPR reduction in OFDM systems using polynomial-based compressing and iterative expanding", 2006 IEEE ICASSP.
Hussain, et al., "Peak to average power ratio reduction for multi-band OFDM system using tone reservation", www.ursi-test.intec.ugent.be/files/URSIGA08/papers/CPS2p5 2008.
Hussain, Sajjad, and Yves Louet. "Tone Reservation's complexity reduction using fast calculation of maximal IDFT element." Wireless Communications and Mobile Computing Conference, 2008. IWCMC'08. International. IEEE, 2008.
Hussein, et al., "Performance enhancement of STBC OFDM-CDMA system using channel coding techniques over multipath

(56) References Cited

OTHER PUBLICATIONS fading channel", Journal of Theoretical and Applied Information Technology, vol. 5, No. 5, pp. 591-601, Jun. 2009.
Jafari, "Adaptive lattice reduction in MIMO systems", Thesis, University of Waterloo, Canada, 2008.
Jayalath et al, Adaptive PTS Approach for Reduction of Peak-to-Average Power Ratio of OFDM Signal, Electronics Letters, vol. 36, No. 14, Jul. 6, 2000.
Jayalath, et al., "On the PAR reduction of OFDM signals using multiple signal representation", IEEE Communications Letters, vol. 8, No. 7, Jul. 2004.
Jayalath, et al., "SLM and PTS peak-power reduction of OFDM signals without side information", IEEE Transactions on Wireless Communications, vol. 4, No. 5, Sep. 2005.
Jayalath, et al., "Use of data permutation to reduce the peak-to-average power ratio of an OFDM signal", Wireless Communications and Mobile Computing, 2002, 2:187-203.
Jiang et al, An Overview: Peak-to-Average Power Ratio Reduction Techniques for OFDM Signals, IEEE, 2008.
Jiang, et al., "Two novel nonlinear companding schemes with iterative receiver to reduce PAPR in multi-carrier modulation systems", IEEE Transaction on Broadcasting, vol. 52, pp. 268-273, Jun. 2006.
Jimenez et al., "Study and Implementation of complementary Golay sequences for PAR reduction in OFDM signals", Proc. 11th Med. Electrotech. Conf. MELECON 2002, pp. 198-203.
Kasiri, et al., "A preprocessing method for PAPR reduction in OFDM systems by modifying FFT and IFFT matrices", The 18th Annual IEEE International Symposium on Personal, Indoor and Mobile Radio Communications (PIMRC'07).
Kaur, Inderjeet, et al., "The Minimum PAPR Code for OFDM Systems", World Academy of Science, Engineering and Technology 46 2008 p. 285.
Kou et al, A New Peak-to-Average Power-Ratio Reduction Algorithm for OFDM Systems Via Constellation Extension, IEEE 2007.
Lam, Chan-Tong, David D. Falconer, and Florence Danilo-Lemoine. "PAPR reduction using frequency domain multiplexed pilot sequences." Wireless Communications and Networking Conference, 2007. WCNC 2007. IEEE. IEEE, 2007.
Lawrey et al, Peak to Average Power Ratio Reduction of OFDM Signals Using Peak Reduction Carriers, Australia 1999.
Lee et al, Peak Power Reduction Using a Unitary Rotation in Multiple Transmit Antennas, IEEE, 2005.
Lee et al., "Novel low-complexity SLM schemes for PAPR reduction in OFDM systems", Proc. 2008 IEEE Global Telecommunications Conf GLOBECOM 2008.
Lee, et al., "Unitary peak power reduction for short packet communications in multiple transmit antennas", IEEE Trans. Commun., vol. 56, Feb. 2008, pp. 234-244.
Li, X., and L. J. Cimini, "Effects of Clipping and Filtering on the Performance of OFDM", IEEE Commun Lett., vol. 2, No. 5, pp. 131-133, May 1998).
Lim et al, A New PTS OFDM Scheme with Low Complexity for PAPR Reduction, IEEE Transactions on Broadcasting, vol. 52, No. 1, Mar. 2006.
Lim, et al, Design of the Phase Sequences for Selected Mapping OFDM System, Seoul, 2004.
Lin et al, Turbo Coded OFDM System with Peak Power Reduction, IEEE, 2003.
Lin, "Performance analysis in the PAPR of OFDM system via SLM scheme", Master Thesis, Institute of Communication Engineering, Tatung University, Jan. 2004.
Lin, et al., "Selective-mapping type peak power reduction techniques for turbo coded OFDM", 2005 IEEE International Conference on Wireless Networks, Communications and Mobile Computing.
Litwin et al., "The Principles of OFDM" Jan. 2001, pp. 30-48.
Loyka, et al., "On the peak factor of sampled and continuous signals", Proc. 2006 IEEE Vehicular Technology Conf.

Lu et al, Enhanced Interleaved Partitioning PTS for Peak-to-Average Power Ratio Reduction in OFDM Systems, Electronic Letters, vol. 42, No. 17, Aug. 17, 2006.
Lu et al, Peak-to-Average Power Ratio Reduction in OFDM Based on Transformation of Partial Transmit Sequences, Electronics Letters, vol. 42, No. 2, Jan. 19, 2006.
Lu, G., et al, Peak-to-Average Power Ratio Reduction in OFDM Based on Transformation of Partial Transmit Sequences, Electronics Letters, Jan. 19, 2006, vol. 42, No. 2, 2006.
Mackay, David J. C., Relationships Between Sparse Graph Codes, United Kingdom, 2000.
Malkin, et al., "Dynamic allocation of reserved tones for PAR reduction", OFDM Workshop, Aug. 2008, Hamburg Germany.
Malkin, et al., "Optimal constellation distortion for PAR reduction in OFDM systems", Proc. 2008 PIMRC.
Marsalek, "On the reduced complexity interleaving method for OFDM PAPR reduction", Radioengineering, vol. 1, No. 3, Sep. 2006.
Matejka, "DRM PAPR distribution and its relation to classical AM power amplifier", www.urel.feec.vutbr.cz/ra2008/archive/ra2003/papers/169.pdf, Radioelektronika 2003.
Mendes et al, On the Performance of WH-STC-OFDM and WH-SFC-OFDM in Non-Linear Time Variant Channels, Brazil, 2009.
Mobasher et al, Integer-Based Constellation Shaping Method for PAPR Reduction in OFDM Systems, Ontario, Canada, Jun. 14, 2005.
Mobasher et al, PAPR Reduction Using Integer Structures, Ontario, Canada, Apr. 30, 2004.
Mobasher, et al., "Integer-based constellation shaping method for PAPR reduction in OFDM systems", IEEE Transactions on Communications, vol. 54, pp. 119-127, Jan. 2006.
Muller, et al., "OFDM with reduced peak-to-average power ratio by multiple signal representation", Annals of Telecommunications, vol. 52, No. 1-2, pp. 58-67, Feb. 1997.
Muller, S. H., and J. B. Huber, "A Novel Peak Power Reduction Scheme for OFDM", Proc. of PIMRC '97, pp. 1090-1094, 1997.
Nawaz, et al., "PAPR reduction technique for OFDM systems with rotated MPSK constellations and coordinate interleaving", Proc. 2008 IEEE Symp on Comm. & Veh. Technol.
Nguyen et al, On Partial Transmit Sequences for PAR Reduction in OFDM Systems, British Columbia, Canada, 2008.
Nikookar et al, Random Phase Updating Algorithm for OFDM Transmission with Low PAPR, IEEE Transactions on Broadcasting, vol. 48, No. 2, Jun. 2002.
Nikookar et al, Weighted OFDM for Wireless Multipath Channels, IEICE Trans, Commun., vol. E83-B, No. 8, Aug. 2000.
Ouyang et al, A New Symbol Time Estimator for Orthogonal Frequency Division Multiplexing Systems, IEEE 2003.
Park, et al., "Tone reservation method for PAPR reduction scheme", IEEE 802.16e-03/60.
Pise, et al., "Packet forwarding with multiprotocol label switching" World Academy of Science,Engineering and Technology Dec. 2005.
Pradabpet, et al., "A new PAPR reduction in OFDM systems using PTS combined with APPR for TWTA nonlinear HPA", Songklanakarin J. Sci. Technol. 30 (3), 355-360, May-Jun. 2008.
Pradabpet, et al., "A new PTS method using GA for PAPR reduction in OFDM-WLAN 802.11a systems", www.jcsse.org/slide/comp.sub.--int/P0014.pdf.
Pratt et al, OFDM Link Performance with Companding for PAPR Reduction in the Presence of Non-Linear Amplification, Atlanta, Georgia, 2006.
Ragusa, et al., "Invertible clipping for increasing the power efficiency of OFDM amplification", Proc. 2007 IEEE Int. Symposium on Personal Indoor and Mobile Radio Communications.
Rajbanshi, "OFDM-based cognitive radio for DSA networks", Technical Report, The University of Kansas (2007).
Rajbanshi, et al., "Adaptive-mode peak-to-average power ratio reduction algorithm for OFDM-based cognitive radio", 2006 IEEE Vehicular Technology Conf.
Rajbanshi, et al., "OFDM symbol design for peak-to-average power ratio reduction employing non-data bearing subcarriers", Proc. 2008 IEEE Wireless Communications and Networking Conference, pp. 554-558.

(56) References Cited

OTHER PUBLICATIONS

Rajbanshi, et al., "Peak-to-average power ratio analysis for NC-OFDM transmissions", Proc. 2007 IEEE Vehicular Technology Conference.
Ren, "An improved selected mapping scheme for PAPR reduction in OFDM systems", Thesis, University of Cincinnati.
Ryu, Heung-Gyoon, Yingshan Li, and Jin-Soo Park. "An improved ICI reduction method in OFDM communication system." Broadcasting, IEEE Transactions on 51.3 (2005): 395-400.
Saito, et al., "PAPR reduction of MC-CDMA signals by selected mapping with interleavers", Multi-Carrier Spread-Spectrum, Springer Netherlands, pp. 453-460.
Sakran et al, An Efficient Technique for Reducing PAPR of OFDM System n the Presence of Nonlinear High Power Amplifier, Progress in Electromagnetics Research C, vol. 2, 233-241, 2008.
Sakran et al, Combined Interleaving and Companding for PAPR Reduction in OFDM Systems, Progress in Electromagnetics Research C, vol. 6, 67-78, 2009.
Sandberg et al, Receiver-oriented Clipping-effect Mitigation in OPDM—A Worthy Approach?, Sweden, 2005.
Sari, "OFDM peak power reduction techniques performance analysis for WiMAX Systems" Sequans Communications, 4th Annual Wireless Broadband Forum (2005).
Sathananthan, et al., "Reducing intercarrier interference in OFDM systems by partial transmit sequence and selected mapping", Proc. Int'l. Symp. on DSP for Comm. Systems, 2002.
Schenk, et al., "Peak-to-average power reduction in space division multiplexing based OFDM systems through spatial shifting", Electronics Letters, Jul. 21, 2005, vol. 41, No. 15.
Schenk, et al., "The application of spatial shifting for peak-to-average power ratio reduction in MIMO OFDM systems", Proc. 2006 IEEE Vehicular Technol. Conf.
Schurgers, et al., "A systematic approach to peak-to-average power ratio in OFDM", Proc. SPIE vol. 4474, p. 454 (2001).
Seng-Sik Eom et al., "Low-Complexity PAPR Reduction Scheme Without Side Information for OFDM Systems", IEEE Transactions on Signal Processing, vol. 60, Issue 7, pp. 3657-3669, Mar. 23, 2012.
Sezginer et al, Peak Power Reduction in OFDM Systems Using Dynamic Constellation Shaping, France, 2005.
Sezginer, et al., "Metric-based symbol predistortion techniques for peak power reduction in OFDM systems", IEEE Transactions on Wireless Communications, vol. 6, No. 7, Jul. 2007.
Sharif, et al., "On the peak-to-average power of OFDM signals based on oversampling", IEEE Transactions on Communications, vol. 51, No. 1, Jan. 2003.
Siegl, et al., "Directed selected mapping for peak-to-average power ratio reduction in single-antenna OFDM", Proc. Int. OFDM Workshop.
Siegl, et al., "Partial transmit sequences for Peak-to-average power ratio reduction in multiantenna OFDM", EURASIP Journal on Wireless Communications and Networking, vol. 2008, article ID 325829, 11 pages.
Siegl, et al., "Peak-to-average power ratio reduction in multi-user OFDM", Proc. 2007 IEEE Int. Symp. on Information Theory, Stockholm, Sweden, Mar. 2007.
Slimane, Peak-to-Average Power Ratio Reduction of OFDM Signals Using Pulse Shaping, Stockholm, Sweden, Mar. 2007.
Sohn, RBF neural network based SLM peak-to-average power ratio reduction in OFDM systems, ETRI Journal, vol. 29, No. 3, Jun. 2007.
Taha, Performance analysis of ICC technique for OFDM PAPR reduction and its application over BTC, Master's degree project, Stockholm, Sweden 2006.
Tellambura, Improved Phase Factor Computation for the PAR Reduction of an OFDM Signal Using PTS, IEEE Communications Letters, vol. 5, No. 4, Apr. 2001.
Tellambura, Upper Bound on Peak Factor of N-multiple Carriers, Electronics Letters, vol. 33, No. 19, Sep. 11, 1997.

Thomas, PAPR Reduction Via a Fixed Frequency-Domain Weighting Across Multiple OFDM Bauds, Schaumburg, IL 2004.
Thompson et al, Constant Envelope OFDM Phase Modulation: Spectral Containment, Signal Space Properties and Performance, San Diego, CA 2008.
Thompson et al, Constant Envelope OFDM, IEEE Transactions on Communications, vol. 56, No. 8, Aug. 2008.
Thompson et al, The Effectiveness of Signal Clipping for PAPR and Total Degradation Reduction in OFDM Systems, IEEE Globecom, 2005.
Thompson, Steve C., Constant Envelope OFDM Phase Modulation, (Doctoral dissertation, University of California, San Diego) 2005.
Ting-Jung Liang et al., "Synchronization in OFDM-based WLAN with Transmit and Receive Diversities", in IEEE 16th Intl. Symp. on Personal, Indoor and Mobile Radio Comm. PIMRC 2005., vol. 2, Sep. 11-14, 2005, pp. 740-744.
Tsai, et al., "A tail-biting turbo coded OFDM system for PAPR and BER reduction", 2007 IEEE Vehicular Technology Conference.
Tseng, et al., "A reduced-complexity PTS scheme for peak-to-average power ratio reduction in OFDM systems", Proc. European Society for Signal Processing (EURASIP) 2008.
Valbonesi, et al., "Low-complexity method for PAPR reduction in OFDM based on frame expansion parameter selection", 13.sup.th European Signal Processing Conference, Sep. 4-8, 2005, Antalya, Turkey.
Van Welden, et al., "Clipping versus symbol switching for PAPR reduction in coded OFDM", 15.sup.th Annual Symposium of the IEEE/CVT Benelux Chapter, Nov. 13, 2008.
Veeragandham, "Orthogonal frequency division multiplexing" EECS 865:Wireless Communications.
Vijayarangan, et al., "An overview of techniques for reducing peak to average power ratio and its selection criteria for orthogonal frequency division multiplexing radio systems", Journal of Theoretical and Applied Information Technology, vol. 5, No. 5 (Feb. 2009).
Vijayarangan, et al., "Reducing peak to average power ratio in orthogonal frequency division multiplexing using modified peak factor mapping", IE(I) Journal-ET (Feb. 2008).
Wang et al, A Low-Complexity Companding Transform for Peak-to-Average Power Ratio Reduction in OFDM Systems, Republic of China, 2006.
Wang et al, A Simplified Clipping and Filtering Technique for PAR Reduction in OFDM Systems, IEEE Signal Processing Letters, vol. 12, No. 6, Jun. 2005.
Wang et al, OFDM or Single-Carrier Block Transmissions?, IEEE Transactions on Communications, vol. 52, No. 3, Mar. 2004.
Wang, "Peak to average power ratio reduction for OFDM", Research & Standards LGE Mobile Research, USA, Aug. 27, 2007, 3GPP2, TSG-C NTAH.
Wang, "Reduction of the PAPR in OFDM signals by applying PTS mechanism", Master Thesis, Institute of Communication Engineering, Tatung University, Jan. 2004.
Wei, et al., "A modern extreme value theory approach to calculating the distribution of the peak-to-average power ratio in OFDM systems", 2002 IEEE Int. Conf. on Communications, vol. 3, pp. 1686-1690.
Weiss et al, Mutual Interference in OFDM-Based Spectrum Pooling Systems, IEEE, 2004.
Wen, et al., "A sub-optimal PTS algorithm based on particle swarm optimization technique for PAPR reduction in OFDM systems", EURASIP J. Wireless Commun. and Networking (Jan. 2008).
Wen, et al., "The PAPR reduction in OFDM system with the help of signal mapping scheme", International Journal of Applied Science and Engineering 2007, 5, 1: 75-80.
Wesolowski, "On the PAPR minimization using selected mapping algorithm in pilot-assisted OFDM systems", Proc. European Wireless Conference, 2007.
Wu, et al., "8B/10B Codec for efficient PAPR reduction in OFDM communication systems", IEEE Int'l Conf on Wireless Communications, Networking and Mobile Computing (WCNMC), Jun. 13-16, 2005, Maui, HI, USA.

(56) References Cited

OTHER PUBLICATIONS

Wu, et al., "Peak-to-average power ration reduction in OFDM based on transformation of partial transmit sequences", Electronics Letters, Jan. 19, 2006, vol. 42, No. 2.

Wulich, et al., "Is PAPR reduction always justified for OFDM?", Proc. European Wireless Conference, 2007.

Xia Lei, Youxi Tang, Shaoqian Li, "A Minimum Clipping Power Loss Scheme for Mitigating the Clipping Noise in OFDM", GLOBECOM 2003, IEEE, vol. 1, pp. 69, Dec. 2003).

Yang, et al., "Selective vector perturbation precoding and peak to average power ratio reduction of OFDM systems", Proc. IEEE Global Telecommunications Conf., 2008.

Li, Yicai et al, "An Effective Low-Complexity Method for PAPR Reduction in OFDM-based Systems", Mar. 31, 2009-Apr. 2, 2009, IEEE, pp. 176-180.

Yoo et al, A Novel PAPR Reduction Scheme for OFDM Systems: Selective Mapping of Partial Tones (SMOPT), IEEE Transactions on Consumer Electronics, vol. 52, No. 1, Feb. 2006.

Yoo et al, Amplitude PDF Analysis of OFDM Signal Using Probabilistic PAPR Reduction Method, EURASIP Journal on Wireless Communications and Networking, vol. 2011, Article 1D 983915, Jan. 19, 2011.

Zhao, "Distortion-based crest factor reduction algorithms in multi-carrier transmission systems", A Dissertation, Georgia Institute of Technology, Dec. 2007.

Zhao, et al., "A study on the PAPR reduction by hybrid algorithm based on the PTS and GS technique", The Journal of the Korean Institute of Communication Sciences, vol. 31, No. 2A, p. 187, Feb. 2006.

\* cited by examiner

SYSTEM AND METHOD FOR CONTROLLING COMBINED RADIO SIGNALS

CROSS REFERENCE TO RELATED APPLICATIONS

This application is a Continuation of U.S. Ser. No. 14/071,697, filed Nov. 5, 2013, now U.S. Pat. No. 9,160,593, issued Oct. 13, 2015, which is a Continuation of U.S. Ser. No. 12/824,608, filed Jun. 28, 2010, now U.S. Pat. No. 8,582,687, issued Nov. 12, 2013, which is a non-provisional application claiming benefit of priority under 365 U.S.C. §119(e) from U.S. Provisional Application No. 61/221,190 filed Jun. 29, 2009, and U.S. Provisional Application No. 61/220,802 filed Jun. 26, 2009, the entirety of which are expressly incorporated herein by reference.

FIELD OF THE INVENTION

This invention relates to the field of wireless communications of radio-frequency signals. More specifically, it relates to controlling a combined signal, for example to reduce its peak to average power ratio or an inferred error at a receiver.

BACKGROUND OF THE INVENTION

A common signal format for mobile wireless communications is orthogonal frequency-domain multiplexing, or OFDM, and closely related formats such as orthogonal frequency-domain multiple access (OFDMA). For a signal conveyed on an OFDM channel, this is characterized in the frequency domain by a bundle of narrow adjacent subchannels, and in the time domain by a relatively slow series of OFDM symbols each with a time T, each separated by a guard interval $\Delta T$ (see FIG. 1). Within the guard interval before each symbol is a cyclic prefix (CP), comprised of the same signal in the symbol period, cyclically shifted in time. This CP is designed to reduce the sensitivity of the received signal to precise time synchronization in the presence of multipath, i.e., radio-frequency signals reflecting from large objects in the terrain such as tall buildings, hills, etc. If a given symbol is received with a slight time delay (less than $\Delta T$), it will still be received without error. In addition to the data symbols associated with the OFDM "payload", there is also typically a "preamble" signal that establishes timing and other standards. The preamble may have its own CP, not shown in FIG. 1.

In OFDM, the sub-carrier frequencies are chosen so that the sub-carriers are orthogonal to each other, meaning that cross-talk between the sub-channels is eliminated and inter-sub-carrier guard bands are not required. This greatly simplifies the design of both the transmitter and the receiver; unlike conventional FDM, a separate filter for each sub-channel is not required. The orthogonality requires that the sub-carrier spacing is $\Delta f = k/(T_U)$ Hertz, where $T_U$ seconds is the useful symbol duration (the receiver side window size), and k is a positive integer, typically equal to 1. Therefore, with N sub-carriers, the total passband bandwidth will be $B \approx N \cdot \Delta f$ (Hz). The orthogonality also allows high spectral efficiency, with a total symbol rate near the Nyquist rate. Almost the whole available frequency band can be utilized. OFDM generally has a nearly "white" spectrum, giving it benign electromagnetic interference properties with respect to other co-channel users.

When two OFDM signals are combined, the result is in general a non-orthogonal signal. While a receiver limited to the band of a single OFDM signal would be generally unaffected by the out-of-channel signals, when such signals pass through a common power amplifier, there is an interaction, due to the inherent non-linearities of the analog system components.

OFDM requires very accurate frequency synchronization between the receiver and the transmitter; with frequency deviation the sub-carriers will no longer be orthogonal, causing intercarrier interference (ICI), i.e. cross-talk between the sub-carriers. Frequency offsets are typically caused by mismatched transmitter and receiver oscillators, or by Doppler shift due to movement. While Doppler shift alone may be compensated for by the receiver, the situation is worsened when combined with multipath, as reflections will appear at various frequency offsets, which is much harder to correct.

The orthogonality allows for efficient modulator and demodulator implementation using the fast Fourier transform (FFT) algorithm on the receiver side, and inverse FFT (IFFT) on the sender side. While the FFT algorithm is relatively efficient, it has modest computational complexity which may be a limiting factor.

One key principle of OFDM is that since low symbol rate modulation schemes (i.e. where the symbols are relatively long compared to the channel time characteristics) suffer less from intersymbol interference caused by multipath propagation, it is advantageous to transmit a number of low-rate streams in parallel instead of a single high-rate stream. Since the duration of each symbol is long, it is feasible to insert a guard interval between the OFDM symbols, thus eliminating the intersymbol interference. The guard interval also eliminates the need for a pulse-shaping filter, and it reduces the sensitivity to time synchronization problems.

The cyclic prefix, which is transmitted during the guard interval, consists of the end of the OFDM symbol copied into the guard interval, and the guard interval is transmitted followed by the OFDM symbol. The reason that the guard interval consists of a copy of the end of the OFDM symbol is so that the receiver will integrate over an integer number of sinusoid cycles for each of the multipaths when it performs OFDM demodulation with the FFT.

The effects of frequency-selective channel conditions, for example fading caused by multipath propagation, can be considered as constant (flat) over an OFDM sub-channel if the sub-channel is sufficiently narrow-banded, i.e. if the number of sub-channels is sufficiently large. This makes equalization far simpler at the receiver in OFDM in comparison to conventional single-carrier modulation. The equalizer only has to multiply each detected sub-carrier (each Fourier coefficient) by a constant complex number, or a rarely changed value. Therefore, receivers are generally tolerant of such modifications of the signal, without requiring that explicit information be transmitted.

OFDM is invariably used in conjunction with channel coding (forward error correction), and almost always uses frequency and/or time interleaving. Frequency (subcarrier) interleaving increases resistance to frequency-selective channel conditions such as fading. For example, when a part of the channel bandwidth is faded, frequency interleaving ensures that the bit errors that would result from those subcarriers in the faded part of the bandwidth are spread out in the bit-stream rather than being concentrated. Similarly, time interleaving ensures that bits that are originally close together in the bit-stream are transmitted far apart in time, thus mitigating against severe fading as would happen when travelling at high speed. Therefore, similarly to equalization per se, a receiver is typically tolerant to some degree of modifications of this type, without increasing the resulting error rate.

The OFDM signal is generated from the digital baseband data by an inverse (fast) Fourier transform (IFFT), which is computationally complex, and as will be discussed below, generates a resulting signal having a relatively high peak to average power ratio (PAPR) for a set including a full range of symbols. This high PAPR, in turn generally leads to increased acquisition costs and operating costs for the power amplifier (PA), and typically a larger non-linear distortion as compared to systems designed for signals having a lower PAPR. This non-linearity leads, among other things, to clipping distortion and intermodulation (IM) distortion, which have the effect of dissipating power, causing out of band interference, and possibly causing in-band interference with a corresponding increase in bit error rate (BER) at a receiver.

In a traditional type OFDM transmitter, a signal generator performs error correction encoding, interleaving, and symbol mapping on an input information bit sequence to produce transmission symbols. The transmission symbols are subjected to serial-to-parallel conversion at the serial-to-parallel (S/P) converter and converted into multiple parallel signal sequences. The S/P converted signal is subjected to inverse fast Fourier transform at IFFF unit. The signal is further subjected to parallel-to-serial conversion at the parallel-to-serial (P/S) convert converter, and converted into a signal sequence. Then, guard intervals are added by the guard interval (GI) adding unit. The formatted signal is then up-converted to a radio frequency, amplified at the power amplifier, and finally transmitted as an OFDM signal by a radio antenna.

On the other hand, in a traditional type the OFDM receiver, the radio frequency signal is down-converted to baseband or an intermediate frequency, and the guard interval is removed from the received signal at the guard interval removing unit. Then, the received signal is subjected to serial-to-parallel conversion at S/P converter, fast Fourier transform at the fast Fourier transform (FFT) unit, and parallel-to-serial conversion at P/S converter. Then, the decoded bit sequence is output.

It is conventional for each OFDM channel to have its own transmit chain, ending in a power amplifier (PA) and an antenna element. However, in some cases, one may wish to transmit two or more separate OFDM channels using the same PA and antenna, as shown in FIG. 2. This may permit a system with additional communications bandwidth on a limited number of base-station towers. Given the drive for both additional users and additional data rate, this is highly desirable. The two channels may be combined at an intermediate frequency using a two-stage up-conversion process as shown in FIG. 2. Although amplification of real baseband signals is shown in FIG. 2, in general one has complex two-phase signals with in-phase and quadrature up-conversion (not shown). FIG. 2 also does not show the boundary between digital and analog signals. The baseband signals are normally digital, while the RF transmit signal is normally analog, with digital-to-analog conversion somewhere between these stages.

Consider two similar channels, each with average power $P_0$ and maximum instantaneous power $P_1$. This corresponds to a peak-to-average power ratio PAPR=$P_1/P_0$, usually expressed in dB as PAPR[dB]=10 log($P_1/P_0$). For the combined signal, the average power is 2 $P_0$ (an increase of 3 dB), but the maximum instantaneous power can be as high as 4 $P_1$, an increase of 6 dB. Thus, PAPR for the combined signal can increase by as much as 3 dB. This maximum power will occur if the signals from the two channels happen to have peaks which are in phase. This may be a rare transient occurrence, but in general the linear dynamic range of all transmit components must be designed for this possibility. Nonlinearities will create intermodulation products, which will degrade the signal and cause it to spread into undesirable regions of the spectrum. This, in turn, may require filtering, and in any case will likely reduce the power efficiency of the system.

Components with required increases in linear dynamic range to handle this higher PAPR include digital-to-analog converters, for example, which must have a larger number of effective bits to handle a larger dynamic range. But even more important is the power amplifier (PA), since the PA is generally the largest and most power-intensive component in the transmitter. While it is sometimes possible to maintain components with extra dynamic range that is used only a small fraction of the time, this is wasteful and inefficient, and to be avoided where possible. An amplifier with a larger dynamic range typically costs more than one with a lower dynamic range, and often has a higher quiescent current drain and lower efficiency for comparable inputs and outputs.

This problem of the peak-to-average power ratio (PAPR) is a well-known general problem in OFDM and related waveforms, since they are constructed of multiple closely-spaced subchannels. There are a number of classic strategies to reducing the PAPR, which are addressed in such review articles as "Directions and Recent Advances in PAPR Reduction Methods", Hanna Bogucka, Proc. 2006 IEEE International Symposium on Signal Processing and Information Technology, pp. 821-827, incorporated herein by reference. These PAPR reduction strategies include amplitude clipping and filtering, coding, tone reservation, tone injection, active constellation extension, and multiple signal representation techniques such as partial transmit sequence (PTS), selective mapping (SLM), and interleaving. These techniques can achieve significant PAPR reduction, but at the expense of transmit signal power increase, bit error rate (BER) increase, data rate loss, increase in computational complexity, and so on. Further, many of these techniques require the transmission of additional side-information (about the signal transformation) together with the signal itself, in order that the received signal be properly decoded. Such side-information reduces the generality of the technique, particularly for a technology where one would like simple mobile receivers to receive signals from a variety of base-station transmitters. To the extent compatible, the techniques disclosed in Bogucka, and otherwise known in the art, can be used in conjunction with the techniques discussed herein-below.

Various efforts to solve the PAPR (Peak to Average Power Ratio) issue in an OFDM transmission scheme, include a frequency domain interleaving method, a clipping filtering method (See, for example, X. Li and L. J. Cimini, "Effects of Clipping and Filtering on the Performance of OFDM", IEEE Commun. Lett., Vol. 2, No. 5, pp. 131-133, May, 1998), a partial transmit sequence (PTS) method (See, for example, L. J Cimini and N. R. Sollenberger, "Peak-to-Average Power Ratio Reduction of an OFDM Signal Using Partial Transmit Sequences", IEEE Commun. Lett., Vol. 4, No. 3, pp. 86-88, March, 2000), and a cyclic shift sequence (CSS) method (See, for example, G. Hill and M. Faulkner, "Cyclic Shifting and Time Inversion of Partial Transmit Sequences to Reduce the Peak-to-Average Ratio in OFDM", PIMRC 2000, Vol. 2, pp. 1256-1259, September 2000). In addition, to improve the receiving characteristic in OFDM transmission when a non-linear transmission amplifier is used, a PTS method using a minimum clipping power loss scheme (MCPLS) is proposed to minimize the power loss clipped by a transmission amplifier (See, for example, Xia Lei, Youxi Tang, Shaoqian Li, "A Minimum Clipping Power Loss Scheme for Mitigating the Clipping Noise in OFDM", GLOBECOM 2003, IEEE, Vol. 1, pp. 6-9, December 2003). The MCPLS is also applicable to a cyclic shifting sequence (CSS) method.

In a partial transmit sequence (PTS) scheme, an appropriate set of phase rotation values determined for the respective subcarriers in advance is selected from multiple sets, and the selected set of phase rotations is used to rotate the phase of each of the subcarriers before signal modulation in order to reduce the peak to average power ratio (See, for example, S. H. Muller and J. B. Huber, "A Novel Peak Power Reduction Scheme for OFDM", Proc. of PIMRC '97, pp. 1090-1094, 1997; and G. R. Hill, Faulkner, and J. Singh, "Deducing the Peak-to-Average Power Ratio in OFDM by Cyclically Shifting Partial Transmit Sequences", Electronics Letters, Vol. 36, No. 6, 16 Mar., 2000).

What is needed is a practical method and associated apparatus for reducing the PAPR of combined OFDM signals, in a way that does not degrade the received signal or require the transmission of side-information.

The following patents, each of which are expressly incorporated herein by reference, relate to peak power ratio considerations: U.S. Pat. Nos. 7,535,950; 7,499,496; 7,496,028; 7,467,338; 7,463,698; 7,443,904; 7,376,202; 7,376,074; 7,349,817; 7,345,990; 7,342,978; 7,340,006; 7,321,629; 7,315,580; 7,292,639; 7,002,904; 6,925,128; 7,535,950; 7,499,496; 7,496,028; 7,467,338; 7,443,904; 7,376,074; 7,349,817; 7,345,990; 7,342,978; 7,340,006; 7,339,884; 7,321,629; 7,315,580; 7,301,891; 7,292,639; 7,002,904; 6,925,128; 5,302,914; 20100142475; 20100124294; 20100002800; 20090303868; 20090238064; 20090147870; 20090135949; 20090110034; 20090110033; 20090097579; 20090086848; 20090080500; 20090074093; 20090067318; 20090060073; 20090060070; 20090052577; 20090052561; 20090046702; 20090034407; 20090016464; 20090011722; 20090003308; 20080310383; 20080298490; 20080285673; 20080285432; 20080267312; 20080232235; 20080112496; 20080049602; 20080008084; 20070291860; 20070223365; 20070217329; 20070189334; 20070140367; 20070121483; 20070098094; 20070092017; 20070089015; 20070076588; 20070019537; 20060268672; 20060247898; 20060245346; 20060215732; 20060126748; 20060120269; 20060120268; 20060115010; 20060098747; 20060078066; 20050270968; 20050265468; 20050238110; 20050100108; 20050089116; and 20050089109.

See, also, each of which is expressly incorporated herein by reference:

VIJAYARANGAN, ET AL., "An overview of techniques for reducing peak to average power ratio and its selection criteria for orthogonal frequency division multiplexing radio systems", Journal of Theoretical and Applied Information Technology, vol 5, no. 5 (February 2009).

HUSSAIN, ET AL., "Tone reservation's complexity reduction using fast calculation of maximal IDFT element", IEEE, IWCMC 08, Greece (2008)

ZHAO, ET AL., "A study on the PAPR reduction by hybrid algorithm based on the PTS and GS technique", The Journal of the Korean Institute of Communication Sciences, Vol. 31, No. 2A, p. 187, February 2006.

MARSALEK, "On the reduced complexity interleaving method for OFDM PAPR reduction", Radioengineering, vol. 1, no 3, September 2006

WU, ET AL., "8B/10B Codec for efficient PAPR reduction in OFDM communication systems", IEEE Int'l Conf on Wireless Communications, Networking and Mobile Computing (WCNMC), Jun. 13-16, 2005, Maui, Hi., USA.

HUSSEIN, ET AL., "Performance enhancement of STBC OFDM-CDMA system using channel coding techniques over multipath fading channel", Journal of Theoretical and Applied Information Technology, Vol. 5, No. 5, pp. 591-601, June, 2009.

MULLER, ET AL., "OFDM with reduced peak-to-average power ratio by multiple signal representation", Annals of Telecommunications, vol. 52, no 1-2, pp. 58-67, February 1997

MOBASHER, ET AL., "Integer-based constellation shaping method for PAPR reduction in OFDM systems", IEEE Transactions on Communications, vol. 54, pp. 119-126, January 2006.

DEUMAL, ET AL., "Peak reduction of multi-carrier systems by controlled spectral outgrowth", Proc. IEEE Intl. Conf. on Acoustics, Speech and Signal Processing (ICASSP), 2006.

WEN, ET AL., "The PAPR reduction in OFDM system with the help of signal mapping scheme", International Journal of Applied Science and Engineering 2007, 5, 1: 75-80

SOHN, "RBF neural network based SLM peak-to-average power ratio reduction in OFDM systems, ETRI Journal, Volume 29, Number 3, June 2007

SATHANANTHAN, ET AL., "Reducing intercarrier interference in OFDM systems by partial transmit sequence and selected mapping", Proc. Int'l. Symp. on DSP for Comm. Systems, 2002.

TSENG, ET AL., "A reduced-complexity PTS scheme for peak-to-average power ratio reduction in OFDM systems", Proc. European Society for Signal Processing (EURASIP) 2008.

BEHRAVAN, ET AL., "Iterative estimation and cancellation of nonlinear distortion in OFDM systems", www.mantracom.com/downloads Jun. 19, 2008

VIJAYARANGAN, ET AL., "Reducing peak to average power ratio in orthogonal frequency division multiplexing using modified peak factor mapping", IE(I) Journal-ET (February, 2008)

PRADABPET, ET AL., "A new PAPR reduction in OFDM systems using PTS combined with APPR for TWTA nonlinear HPA", Songklanakarin J. Sci. Technol. 30 (3), 355-360, May-June 2008

MATEJKA, "DRM PAPR distribution and its relation to classical AM power amplifier", www.urel.feec.vutbr.cz/ra2008/archive/ra2003/papers/169.pdf, Radioelektronika 2003

DE FIGUEIREDO, "Adaptive pre-distorters for linearization of high power amplifiers in OFDM wireless communications", IEEE North Jersey Section CASS/EDS Chapter, Distinguished lecture TAHA, "Performance analysis of ICC technique for OFDM PAPR reduction and its application over BTC, Master's degree project, Stockholm, Sweden 2006

JAYALATH, ET AL., "On the PAR reduction of OFDM signals using multiple signal representation", IEEE Communications Letters, vol. 8, no. 7, July 2004

ANDGART, ET AL., "Designing Tone Reservation PAR reduction", EURASIP Journal on applied Signal Processing, vol 2006, article ID 38237, pages 1-14

SIEGL, ET AL., "Partial transmit sequences for Peak-to-average power ratio reduction in multiantenna OFDM", EURASIP Journal on Wireless Communications and Networking, vol. 2008, article ID 325829, 11 pages WEN, ET AL., "A sub-optimal PTS algorithm based on particle swarm optimization technique for PAPR reduction in OFDM systems", EURASIP J. Wireless Commun. and Networking (January 2008).

DENG, ET AL., "OFDM PAPR reduction using clipping with distortion control", Proc. 2005 IEEE Conf. on Communications.

LIN, ET AL., "Selective-mapping type peak power reduction techniques for turbo coded OFDM", 2005 International Conference on Wireless Networks, Communications and Mobile Computing AL-KEBSI, ET AL., "Throughput enhancement and performance improvement of the OFDM based WLAN system", IJCSNS International Journal of Computer Science and Network Security, vol. 9, no. 4, April 2009

GIANNOPOULOS, ET AL., "Novel efficient weighting factors for PTS-based PAPR reduction in low-power OFDM transmitters", www.eurasip.org/proceedings/Eusipco/Eusipco2006/papers/1568982220 2006

WULICH, ET AL., "Is PAPR reduction always justified for OFDM?", Proc. European Wireless Conference, 2007.

WESOLOWSKI, "On the PAPR minimization using selected mapping algorithm in pilot-assisted OFDM systems", Proc. European Wireless Conference, 2007.

ALHARBI, ET AL., "A combined SLM and closed-loop QO-STBC for PAPR mitigation in MIMO-OFDM transmission". www.eurasip.org/proceedings/Eusipco/Eusipco2008/papers/1569102063 2008

YANG, ET AL., "Selective vector perturbation precoding and peak to average power ratio reduction of OFDM systems", Proc. IEEE Global Telecommunications Conf., 2008.

TSAI, ET AL., "A tail-biting turbo coded OFDM system for PAPR and BER reduction", 2007 IEEE Vehicular Technology Conference.

BAXLEY, "Analyzing selected mapping for peak-to-average power reduction in OFDM", Thesis, School of Electrical and Computer Engineering, Georgia Institute of Technology, May 2005

WANG, "Peak to average power ratio reduction for OFDM", Research & Standards LGE Mobile Research, USA, Aug. 27, 2007, 3GPP2, TSG-C NTAH.

PARK, ET AL., "Tone reservation method for PAPR reduction scheme", IEEE 802.16e-03/60

BREILING, ET AL., "SLM peak-power reduction without explicit side information", IEEE Communications Letters, vol. 5, no. 6, June 2001

GUEL, ET AL., "Approximation of the average power variation for geometric adding signal approach of PAPR reduction in context of OFDM signals", Union Radio Scientifique Internationale-URSI, Aug. 7-16, 2008, Chicago, Ill.

HUSSAIN, ET AL., "Peak to average power ratio reduction for multi-band OFDM system using tone reservation", www.ursi-test.intec.ugent.be/files/URSIGA08/papers/CPS2p5

VALBONESI, ET AL., "Low-complexity method for PAPR reduction in OFDM based on frame expansion parameter selection", 13$^{th}$ European Signal Processing Conference, Sep. 4-8, 2005, Antalya, Turkey BREILING, ET AL., "Distortionless reduction of peak power without explicit side information", 2000 IEEE Global Telecommunications Conference.

JAYALATH, ET AL., "Use of data permutation to reduce the peak-to-average power ratio of an OFDM signal", Wireless Communications and Mobile Computing, 2002, 2:187-203

JAYALATH, ET AL., "On the PAR reduction of OFDM signals using multiple signal representation", IEEE communications Letters, vol. 8, no. 7, July 2004

JAYALATH, ET AL., "SLM and PTS peak-power reduction of OFDM signals without side information", IEEE Trans. on Wireless Communications, vol. 4, no. 5, September 2005

VEERAGANDHAM, "Orthogonal frequency division multiplexing" EECS 865: Wireless Communications FISCHER, ET AL., "Directed selected mapping for peak-to-average power ratio reduction in MIMO OFDM", Proc. International OFDM Workshop, 2007.

FISCHER, "Widely-linear selected mapping for peak-to-average power ratio reduction in OFDM", Electronics Letters, vol. 43, 2007.

WANG, "Reduction of the PAPR in OFDM signals by applying PTS mechanism", Master Thesis, Institute of Communication Engineering, Tatung University, January 2004

LIN, "Performance analysis in the PAPR of OFDM system via SLM scheme", Master Thesis, Institute of Communication Engineering, Tatung University, January 2004

RAJBANSHI, ET AL., "Peak-to-average power ratio analysis for NC-OFDM transmissions", Proc. 2007 IEEE Vehicular Technology Conference.

SAITO, ET AL., "PAPR reduction of MC-CDMA signals by selected mapping with interleavers", Multi-Carrier Spread-Spectrum, Springer Netherlands, pp. 453-460

HABENDORF, ET AL., "Nonlinear predistortion with reduced peak-to-average power ratio", Proc. International Symposium on Wireless Communications.

HOSSEINI, ET AL., "PAPR reduction in OFDM systems using polynomial-based compressing and iterative expanding", 2006 IEEE ICASSP.

FISCHER, ET AL., "Peak-to-average power ratio reduction in MIMO OFDM", Proc. 2007 Int. Conf on Communications, pp. 762-767.

RAGUSA, ET AL., "Invertible clipping for increasing the power efficiency of OFDM amplification", Proc. 2007 IEEE Int. Symposium on Personal Indoor and Mobile Radio Communications.

SEZGINER, ET AL., "Metric-based symbol predistortion techniques for peak power reduction in OFDM systems", IEEE Trans. on Wireless Communications, vol. 6, no. 7, July 2007

SIEGL, ET AL., "Peak-to-average power ratio reduction in multi-user OFDM", Proc. 2007 IEEE Int. Symp. on Information Theory.

HENKEL, ET AL., "Partial transmit sequences and trellis shaping", Proc. 5th Int. ITC Conf. on Source and Channel Coding, 2004.

LEE, ET AL., "Unitary peak power reduction for short packet communications in multiple transmit antennas", IEEE Trans. Commun., vol. 56, February 2008, pp. 234-244.

LOYKA, ET AL., "On the peak factor of sampled and continuous signals", Proc. 2006 IEEE Vehicular Technology Conf.

LIN, ET AL., "Selective-mapping type peak power reduction techniques for turbo coded OFDM", 2005 IEEE Conf. on Wireless Networks, Communications and Mobile Computing.

BONACCORSO, ET AL., "Reducing the peak to average power ratio in OFDM systems", Dix-septieme colloque-GRETSI, Vannes, 13-17 Sep. 1999

BAXLEY, ET AL., "Assessing peak-to-average power ratios for communications applications", Proc. IEEE Military Communications Conf (MILCOM 2004).

CHEN, ET AL., "A modified selective mapping with PAPR reduction and error correction in OFDM systems", 2007 IEEE Wireless Com. and Networking Conf., pp. 1329-1333.

FISCHER, "Peak-to-average power ratio (PAR) reduction in OFDM based on lattice decoding", Proc. Int. OFDM Workshop.

SIEGL, ET AL., "Directed selected mapping for peak-to-average power ratio reduction in single-antenna OFDM", Proc. Int. OFDM Workshop.

CIOCHINA, ET AL., "An analysis of OFDM peak power reduction techniques for WiMAX systems", Proc. 2006 Int. Conf on Communications, pp. 4676-4681.

MALKIN, ET AL., "Dynamic allocation of reserved tones for PAR reduction", OFDM Workshop, August 2008, Hamburg Germany PRADABPET, ET AL., "A new PTS method using GA for PAPR reduction in OFDM-WLAN 802.11a systems", www.jcsse.org/slide/comp_int/P0014.pdf WU, ET AL., "Peak-to-average power ratio reduction in OFDM based on transformation of partial transmit sequences", Electronics Letters, Jan. 19, 2006, vol. 42, no. 2

HAIDER, "Peak to average ratio reduction in wireless OFDM communication systems", Thesis, Blekinge Institute of Technology, January 2006

HENKEL, ET AL., "Another application for trellis shaping: PAR reduction for DMT (OFDM), IEEE Transactions on Communications, vol. 48, no. 9, September 2000

FISCHER, ET AL., "Peak-to-average power ratio reduction in single- and multi-antenna OFDM via directed selected mapping", Jul. 19, 2007

HERRAIZ, "Multicarrier communication systems with low sensitivity to nonlinear amplification", Thesis, Eng. i Arquitectura La Salle, Univers. Ramon Llull, Barcelona 2008

KASIRI, ET AL., "A preprocessing method for PAPR reduction in OFDM systems by modifying FFT and IFFT matrices", The 18th Annual IEEE International Symposium on Personal, Indoor and Mobile Radio Communications (PIMRC'07)

MALKIN, ET AL., "Optimal constellation distortion for PAR reduction in OFDM systems", Proc. 2008 PIMRC.

WEI, ET AL., "A modern extreme value theory approach to calculating the distribution of the peak-to-average power ratio in OFDM systems", 2002 IEEE Int. Conf. on Communications, vol. 3, pp. 1686-1690.

RAJBANSHI, ET AL., "Adaptive-mode peak-to-average power ratio reduction algorithm for OFDM-based cognitive radio", 2006 IEEE Vehicular Technology Conf.

REN, "An improved selected mapping scheme for PAPR reduction in OFDM systems", Thesis, University of Cincinnati SOHN, "RBF neural network based SLM peak-to-average power ratio reduction in OFDM systems, ETRI Journal, vol. 29, no. 3, June 2007

BOONSRIMUANG, ET AL., "Mitigation of non-linear distortion using PTS and IDAR method for multi-level QAM-OFDM system", ECTI Transactions on Computer and Information Technology, vol. 1, no. 2, November 2005

SCHENK, ET AL., "The application of spatial shifting for peak-to-average power ratio reduction in MIMO OFDM systems", Proc. 2006 IEEE Vehicular Technol. Conf.

SCHENK, ET AL., "Peak-to-average power reduction in space division multiplexing based OFDM systems through spatial shifting", Electronics Letters, Jul. 21, 2005, vol. 41, no. 15

NAWAZ, ET AL., "PAPR reduction technique for OFDM systems with rotated MPSK constellations and coordinate interleaving", Proc. 2008 IEEE Symp on Comm. & Veh. Technol.

VAN WELDEN, ET AL., "Clipping versus symbol switching for PAPR reduction in coded OFDM", $15^{th}$ Annual Symposium of the IEEE/CVT Benelux Chapter, Nov. 13, 2008

SHARIF, ET AL., "On the peak-to-average power of OFDM signals based on oversampling", IEEE Transactions on Communications, vol. 51, no. 1, January 2003

BAXLEY, ET AL., "Ordered phase sequence testing in SLM for improved blind detection", Proc. 2005 IEEE Conf on Signal Processing Advances in Wireless Communication.

SCHURGERS, ET AL., "A systematic approach to peak-to-average power ratio in OFDM", Proc. SPIE vol 4474, p. 454 (2001).

FISCHER, ET AL., "Signal shaping for peak-power and dynamics reduction in transmission schemes employing precoding", IEEE Trans. on Comm., v50, pp. 735-741, May/2002.

JIANG, ET AL., "Two novel nonlinear companding schemes with iterative receiver to reduce PAPR in multi-carrier modulation systems", IEEE Transaction on Broadcasting, vol. 52, pp. 268-273, June 2006.

JAFARI, "Adaptive lattice reduction in MIMO systems", Thesis, University of Waterloo, Canada, 2008

PISE, ET AL., "Packet forwarding with multiprotocol label switching" World Academy of Science, Engineering and Technology 12 2005

BOCCARDI, ET AL., "The p-sphere encoder: vector precoding with low peak-power for the MIMO Gaussian Broadcast Channel", IEEE Trans. Comm., vol. 54, p. 1703, September 2006.

DEVLIN, ET AL., "Gaussian pulse based tone reservation for reducing PAPR of OFDM signals", 2007 IEEE Vehicular Technol. Conf.

RAJBANSHI, ET AL., "OFDM symbol design for peak-to-average power ratio reduction employing non-data bearing subcarriers", Proc. 2008 IEEE Wireless Communications and Networking Conference, pp. 554-558.

ZHAO, "Distortion-based crest factor reduction algorithms in multi-carrier transmission systems", A Dissertation, Georgia Institute of Technology, December 2007

RAJBANSHI, "OFDM-based cognitive radio for DSA networks", Technical Report, The University of Kansas (2007)

SARI, "OFDM peak power reduction techniques performance analysis for WiMAX Systems" Sequans Communications, 4th Annual Wireless Broadband Forum (2005).

Lee et al., "Novel low-complexity SLM schemes for PAPR reduction in OFDM systems", Proc. 2008 IEEE Global Telecommunications Conf GLOBECOM 2008.

Jimenez et al., "Study and Implementation of complementary Golay sequences for PAR reduction in OFDM signals", Proc. 11th Med. Electrotech. Conf. MELECON 2002, pp. 198-203.

CHOI, ET AL., "Peak power reduction scheme based on subcarrier scrambling for MC-CDMA systems", IEE Proceedings on Communications, vol. 151, pp. 39-43, February 2004.
"Peak-to-average power ratio (PAPR)", Wireless Inf. Trans. System Lab., Mar. 2, 2006
WANG, "PAPR reduction for OFDM", circa 2007
GIANNOPOULOS, ET AL., "Relationship among BER, power consumption and PAPR", 2008 IEEE Int. Symp on Wireless Pervasive Computing, pp. 633-637.
INDERJEET KAUR, et al., "The Minimum PAPR Code for OFDM Systems", World Academy of Science, Engineering and Technology 46 2008 p. 285.
O. DAOUD, et al., "PAPR Reduction by Linear Coding Techniques for MIMO-OFDM Systems Performance Improvement: Simulation and Hardware Implementation", European Journal of Scientific Research, Vol. 36 No. 3 (2009), pp 376-393
Ting-Jung Liang et al., "Synchronization in OFDM-based WLAN with Transmit and Receive Diversities", in IEEE 16th Intl. Symp. on Personal, Indoor and Mobile Radio Comm., PIMRC 2005, vol. 2, 11-14 Sep. 2005, pp. 740-744.

SUMMARY OF THE INVENTION

When multiple radio signals with different carrier frequencies are combined for transmission, this combined signal typically has an increased peak-to-average power ratio (PAPR), owing to the possibility of in-phase combining of peaks, requiring a larger radio-frequency power amplifier (PA) operating at low average efficiency. The PAPR for digital combinations of orthogonal frequency-domain multiplexed (OFDM) channels may be reduced by storing the time-domain OFDM signals for a given symbol period in a memory buffer, and carrying out cyclic time shifts of at least one OFDM signal, in order to select the time-shift corresponding to reduced PAPR of the combined multi-channel signal. This may be applied to signals either at baseband, or on upconverted signals. Simulations show that several decibels reduction in PAPR can be obtained without degrading system performance. No side information needs to be transmitted to the receiver.

A preferred embodiment of the present system and method seeks to control the PAPR by storing the time-domain OFDM signals for a given symbol period in a memory buffer, and carrying out cyclic time shifts of at least one of the OFDM signals, in order to select the time-shift corresponding to a desired PAPR of the combined multi-channel signal. In most cases, it would be desired to reduce the PAPR to a minimum, but this is not a limitation of the technique, and the selected time-shift may be based on other criteria.

It is noted that each of the OFDM signals may be preprocessed in accordance with known schemes, and thus each may have been themselves processed to reduce an intrinsic PAPR, though preferably any preprocessing of the signals is coordinated with the processing of the combined signals to achieve an optimum cost and benefit. For example, where two separate signals are to be combined, each having a high PAPR, a resulting signal of reduced PAPR can be achieved if the peaks add out of phase, and thus cancel. Therefore, initial uncoordinated efforts to modify the input OFDM signals may have limited benefit.

It is noted that the present system seeks to combine independently formatted OFDM, which are generally targeted to different receivers or sets of receivers, and these sets are typically not coordinated with each other. For example, in a cellular transceiver system, a base station may serve hundreds or thousands of cell phones, each phone monitoring a single OFDM broadcast channel, with the base station servicing multiple OFDM channels. It is particularly noted that each set of OFDM subcarriers is orthogonal, but the separate OFDM signals, and their subcarriers, are generally not orthogonal with each other. The OFDM signals may be in channels which are adjacent or displaced, and therefore a relative phase change between OFDM signals can occur during a single symbol period. Therefore, the PAPR must be considered over the entire symbol period.

Indeed, according to another embodiment of the method, it is not the PAPR of the signal which is analyzed for optimization, but rather an inferred error at the receiver. This, if the PAPR of the composite signal is high for only a small portion of a symbol period, such that the PA distorts or clips the signal at that time, but at most other times the combined signals are well within specification, the result may be an acceptable transmission which would likely result in a low error probability. Indeed, in some cases, the error probability may be lower than for signals with a lower absolute peak. Therefore, by employing a model of a receiver, which itself may include margins for specific communication channel impairments to specific receivers, and Doppler shifts (which may be determined, for example by analyzing return path characteristics), or over a range of possible variation, as part of the transmitter signal processing path, better performance may be available than by simply minimizing the PAPR.

Another option is to modify the OFDM signal during all or a portion of the period in a manner which deviates from a standard protocol, which is, for example an IEEE-802 OFDM standard, WiFi, WiMax, DAB, DVB, cellular communication, LTE signal, or the like, but which does not substantively increase a predicted BER of a standard or specific receiver. For example, if the PAPR is high for a small portion a symbol period, such that if during a portion of the symbol period, one or more subcarriers were eliminated or modified, the PAPR would be acceptable, and the signal at the receiver would have sufficient information to be decoded using a standard receiver without significant increase in BER, then the transmitter could implement such modifications without need to transmit side information identifying the modifications which necessary for demodulation. Another possible deviation is, for example, to frequency shift the signal (which mildly violates the orthogonality criterion), within the tolerance of a receiver to operate within a range of Doppler shifts which are equivalent to frequency shifts.

Consider two OFDM signals that are being combined as in FIG. 2. For simplicity, call Signal 1 (S1) the reference signal, and Signal 2 (S2) the modified signal. During each OFDM symbol period, the baseband digital data bits for each signal will be stored in memory. Assume that the Preamble has been stripped off, but the Cyclic Prefix CP remains. As indicated in FIG. 3 for one embodiment of the invention, the bits for the reference signal S1 are stored in a first-in-first-out (FIFO) shift register (SR). The corresponding bits for the modified signal S2 are stored in a circular shift register (CSR), so configured that the data contained can be rotated under program control. The data for both signals are first up-converted to an intermediate frequency (IF) and then combined (added), while maintaining digital format at a sampling frequency increased over the digital data rate. The combined IF signals are then subjected to a PAPR test, to determine whether the peak power level is acceptable, or, in other embodiments, whether other criteria are met. This might correspond, for example, to a PAPR of 9 dB. If the test is passed, then the data bits for the combined OFDM symbols are read out, to be subsequently reassembled into the full OFDM frame and up-converted to the full RF, for further amplification in the PA and transmission. According to another embodiment, a combined OFDM representation of the combined data is itself the source for the up-conversion.

More generally, once the parametric transformation (relative time-shift) to achieve the desired criteria is determined, the final signal is then formulated dependent on that parameter or a resulting representation, which may be the digital data bits of the baseband signal or a converted form thereof; in the latter case, the system may implement a series of transformations on the data, some of which are redundant or failed, seeking an acceptable one or optimum one; once that is found, it may not be necessary to repeat the series or transformations again. Likewise, the option of reverting to the original digital data and repeating the determined series of transformations allows a somewhat different representation to be formed in the register, for example one which is simplified or predistorted to allow consideration of analog component performance issues in the combining test.

Even more generally, the technique provides that each signal to be combined is provided with a range of one or more acceptable parameters, which may vary incrementally, algorithmically, randomly, or otherwise, and at least a portion of the possible combinations tested and/or analyzed for conformity with one or more criteria, and thereafter the combination of OFDM signals implemented using the selected parameter(s) from a larger set of available parameters. This parametric variation and testing may be performed with high speed digital circuits, such as superconducting logic, in a serial fashion, or slower logic with parallelization as necessary, though other technologies may be employed as appropriate and/or necessary, including but not limited to optical computers, programmable logic arrays, massively parallel computers (e.g., graphic processors, such as nVidia Tesla® GPU, ATI Radeon R66, R700), and the like. The use of superconducting digital circuits may be advantageous, for example, where a large number of complex computations which make significant use of a specialized high speed processor, such as where a large number of independent receivers are modeled as part of a transmitter optimization.

In the preferred embodiment, at any state of the tests over the parametric range, if the test is not passed, a control signal is fed back to the register, e.g., CSR, which rotates the data bits of the modified signal S2. The shifted data is then combined with the initial stored data from S1 as before, and the PAPR re-tested. This is repeated until the PAPR test is passed. A similar sequence of steps is illustrated in FIG. 4, where stripping off the preamble and reattaching it at the end are explicitly shown. It is noted that, in some cases, the tests may be applied in parallel, and therefore a strictly iterative test is not required. This, in turn, permits use of lower speed testing logic, albeit of higher complexity. Likewise, at each relative time-shift, a secondary parameter may also be considered.

For example, a secondary consideration for optimal combining may be in-band (non-filterable) intermodulation distortion. Thus, at each basic parametric variation, the predicted in-band intermodulation distortion, expressed, for example, as a power and/or inferred BER, may be calculated. This consideration may be merged with the PAPR, for example, by imposing a threshold or optimizing a simple linear combination "cost function", within an acceptable PAPR range.

While there may be some delays in this Shift-and-Add process (SAA), the time for the entire decision algorithm, including all iterations, must not exceed the expanded symbol time T+ΔT. We have described a serial decision process in FIGS. 3 and 4. As discussed, above, in some cases, it may be preferable to carry out parts of this process in parallel, using multiple CSRs with different shifts and multiple parallel PAPR tests, in order to complete the process more quickly. This is illustrated in FIG. 5, which suggests parallel memories (shown here as RAMs), each with an appropriate time shift, where the minimum PAPR is selected to send to the RF subsystem. The optimum tradeoff between circuit speed and complexity will determine the preferred configuration.

In some situations, the search for an optimum combined signal requires vast computational resources. In fact, heuristics may be available to limit the search while still achieving an acceptable result. In the case of a PAPR optimization, generally the goal is to test for limited, low probability "worst case" combinations of symbols. If the raw digital data is available, a lookup table may be employed to test for bad combinations, which can then be addressed according to a predetermined modification. However, for multi-way combinations of complex symbols this lookup table may be infeasible. On the other hand, the individual OFDM waveforms may each be searched for peaks, for example 6 dB above mean, and only these portions of the signal analyzed to determine whether there is a temporal alignment with the peaks of other OFDM signals; if the peaks are not temporally synchronized, then a presumption is made that an unacceptable peak will not result in the final combined signal. This method makes a presumption that should be statistically acceptable, that is, that only portions of an OFDM waveform that are themselves relative peaks will contribute to large peaks in the combination of OFDM signals. This method avoids serial testing of sequential parametric variations, and rather simply avoids worst case superpositions of a binary threshold condition.

It is important to note that the circularly shifted symbol data for the modified signal represents exactly the same set of symbols as the unshifted data. Further, because of the standard properties of OFDM signals, the shifted symbol set can be transmitted and received with no special side-information, and with no degradation of signal integrity. So the combined OFDM channels with reduced PAPR should exhibit essentially the same performance as the original unshifted version. A set of detailed simulations that confirm this are described in the Detailed Description section below.

Although these figures focus on the case of reducing PAPR for the combination of two OFDM channels, this method is not limited to two channels. Three or more channels can be optimized by a similar method of circular time shifts, followed by PAPR tests.

DETAILED DESCRIPTION OF THE PREFERRED EMBODIMENTS

Figure 1A:
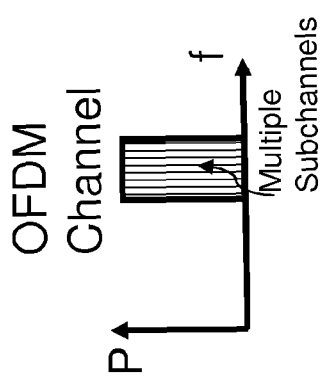
FIGS. 1A and 1B shows typical behavior of an orthogonal frequency-domain multiplexed channel in the frequency and time domains.
Figure 1B:
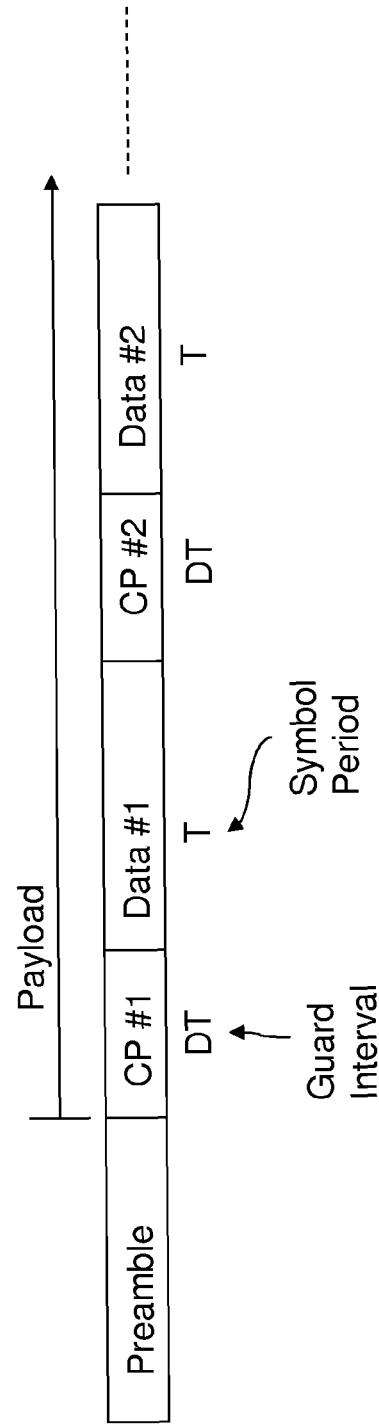
Figure 2:
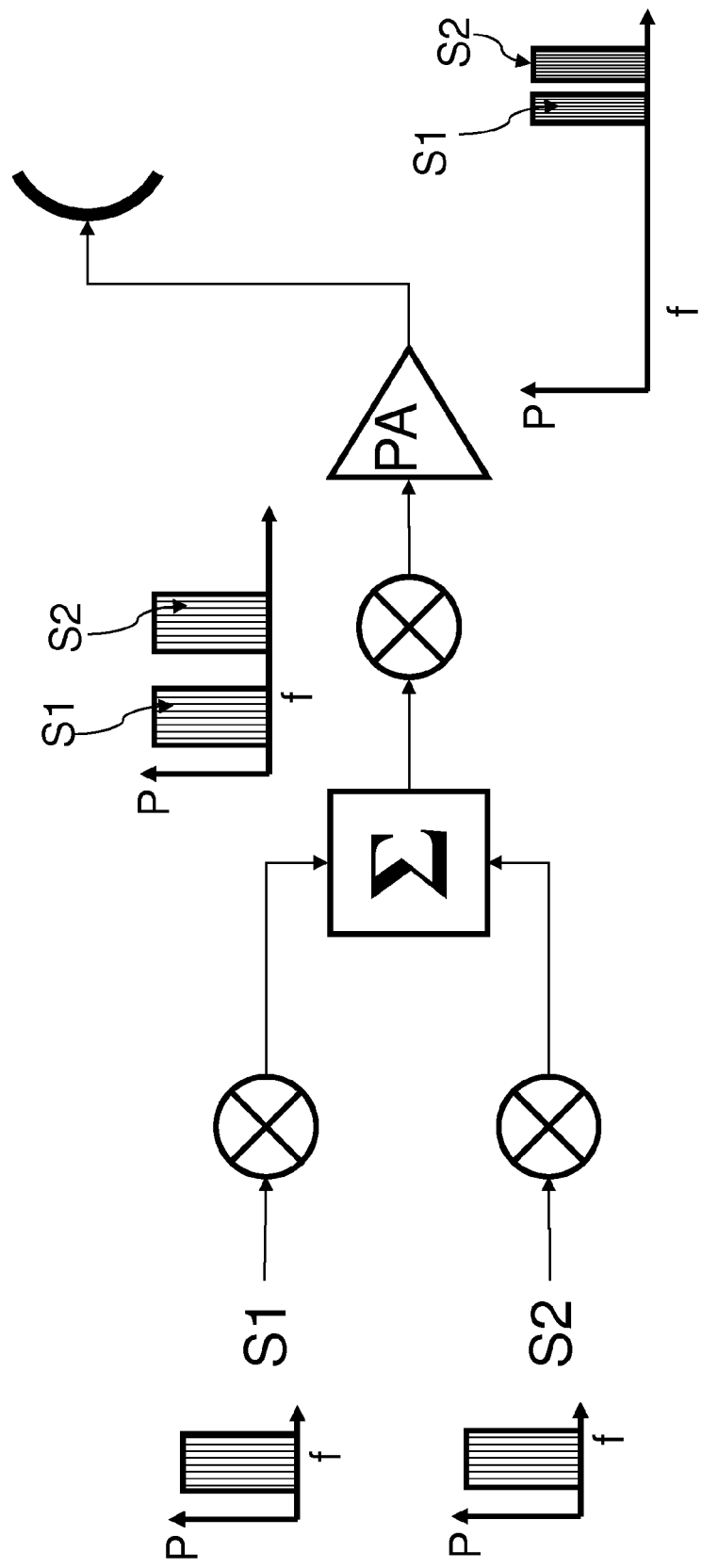
FIG. 2 shows the combination of two OFDM channels in a transmitter using a double-upconversion method.

OFDM channels are comprised of many sub-channels, each of which is a narrow-band signal (FIGS. 1A and 1B). An OFDM channel itself has a time-varying envelope, and may exhibit a substantial PAPR, typically 9-10 dB. However, if two separate similar OFDM channels are combined, the resulting signal will exhibit PAPR of 12-13 dB, for a gain of 3 dB. This is unacceptably large, since it would require a power amplifier with 4 times the capacity to transmit a combined signal that averages only 2 times larger.

A preferred embodiment therefore provides a PAPR reduction method which reduces the PAPR of a two OFDM channel combined signal from 12-13 dB back down to the 9-10 dB of the original components. This ~3 dB reduction in PAPR is preferably accomplished without degradation of the signal, and without the need to transmit any special side information that the receiver would need to recover the OFDM symbols. Further, the algorithm is simple enough that it can be implemented in any hardware technology, as long as it is sufficiently fast.

Conventional methods of PAPR reduction focus on combining the sub-channels and generating a single OFDM channel without excessive PAPR. The present technique can be viewed in certain respects as a combination of Partial Transmit Sequence (PTM) and Selected Mapping (SLM).

In traditional PTS, an input data block of N symbols is partitioned into disjoint sub-blocks. The sub-carriers in each sub-block are weighted by a phase factor for that sub-block. The phase factors are selected such that the PAPR of the combined signal is minimized.

In the SLM technique, the transmitter generates a set of sufficiently different candidate data blocks, all representing the same information as the original data block, and selects the most favorable for transmission (lowest PAPR without signal degradation).

The present hybrid approach combines elements of PTS and SLM for summed carrier modulated signals. The various cyclic time-shifts of the oversampled OFDM waveform are searched, and the time-shift with the lowest PAPR selected. One OFDM signal is used as reference and the other carrier modulated signal(s) are used to generate the time-shifts, in a manner similar to PTS. The search window is determined by the cyclic prefix length and the oversampling rate.

While the phase space of possible combinations of shifts increases tremendously, it would not be necessary to explore all such combinations. In general, very high values of the PAPR occur relatively rarely, so that most time shifts starting with a high-PAPR state would tend to result in a reduction in PAPR. Shifts in multiple channels could be implemented sequentially or in parallel, or in some combination of the two. Thus, for example, any combination with a PAPR within an acceptable range is acceptable, any unacceptable PAPR states occur 1% of the time, the search space to find an acceptable PAPR would generally be <2% of the possible states. On the other hand, if other acceptability criteria are employed, a larger search space may be necessary or appropriate. For example, assuming that there is a higher cost for transmitting a higher PAPR signal, e.g., a power cost or an interference cost, then a formal optimization may be appropriate. Assuming that no heuristic is available for predicting an optimal state, a full search of the parametric space may then be appropriate to minimize the cost.

This differs from conventional approaches, wherein different OFDM channels are independent of one another, with separate transmit chains and without mutual synchronization. Further, the conventional approaches operate directly on the baseband signals. In contrast, the present method evaluates PAPR on an up-converted, combined signal that incorporates two or more OFDM channels, and the symbol periods for each of these channels must be synchronized. This will not cause problems at the receivers, where each channel is received and clocked independently.

Some conventional approaches to PAPR are based on clipping, but these inevitably produce distortion and out-of-band generation. Some other approaches avoid distortion, but require special transformations that must be decoded at the receive end. These either require sending side-information, or involve deviations from the standard OFDM communication protocols. The present preferred approach has neither shortcoming.

OFDM channels used in cellular communications, may be up to 10 or 20 MHz in bandwidth. However, these channels might be located in a much broader frequency band, such as 2.5-2.7 GHz. So one might have a combination of two or more OFDM channels, each 10 MHz wide, separated by 100 MHz or more. A 10 MHz digital baseband signal may be sampled at a rate as low as 20 MS/s, but a combined digital signal covering 100 MHz must be sampled at a rate of at least 200 MS/s.

Figure 3:
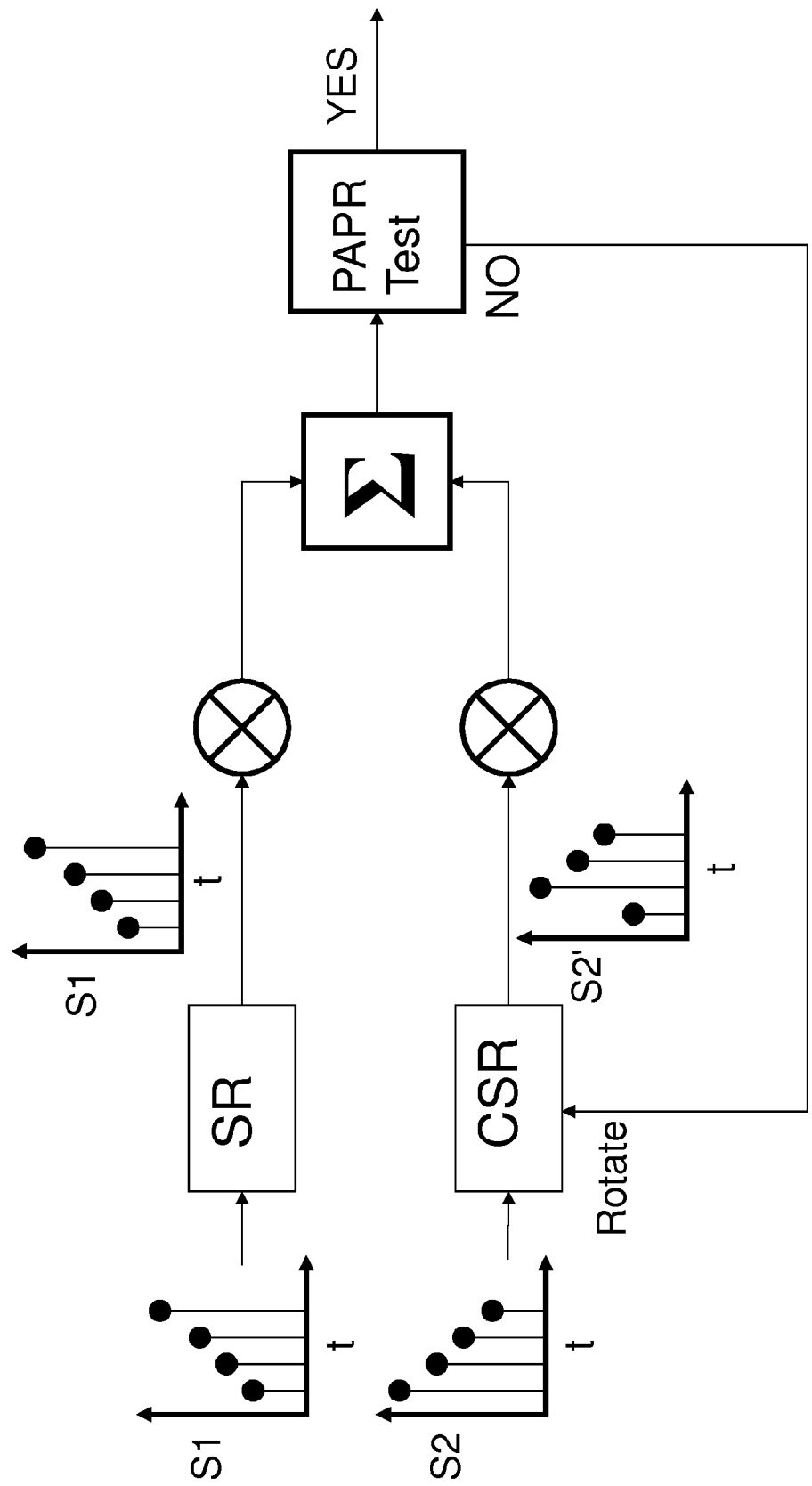
FIG. 3 provides a simple block diagram showing how two OFDM channels may be combined, wherein the data bits of one OFDM channel may be cyclically shifted in order to reduced the peak-to-average power ratio (PAPR).
Figure 4:
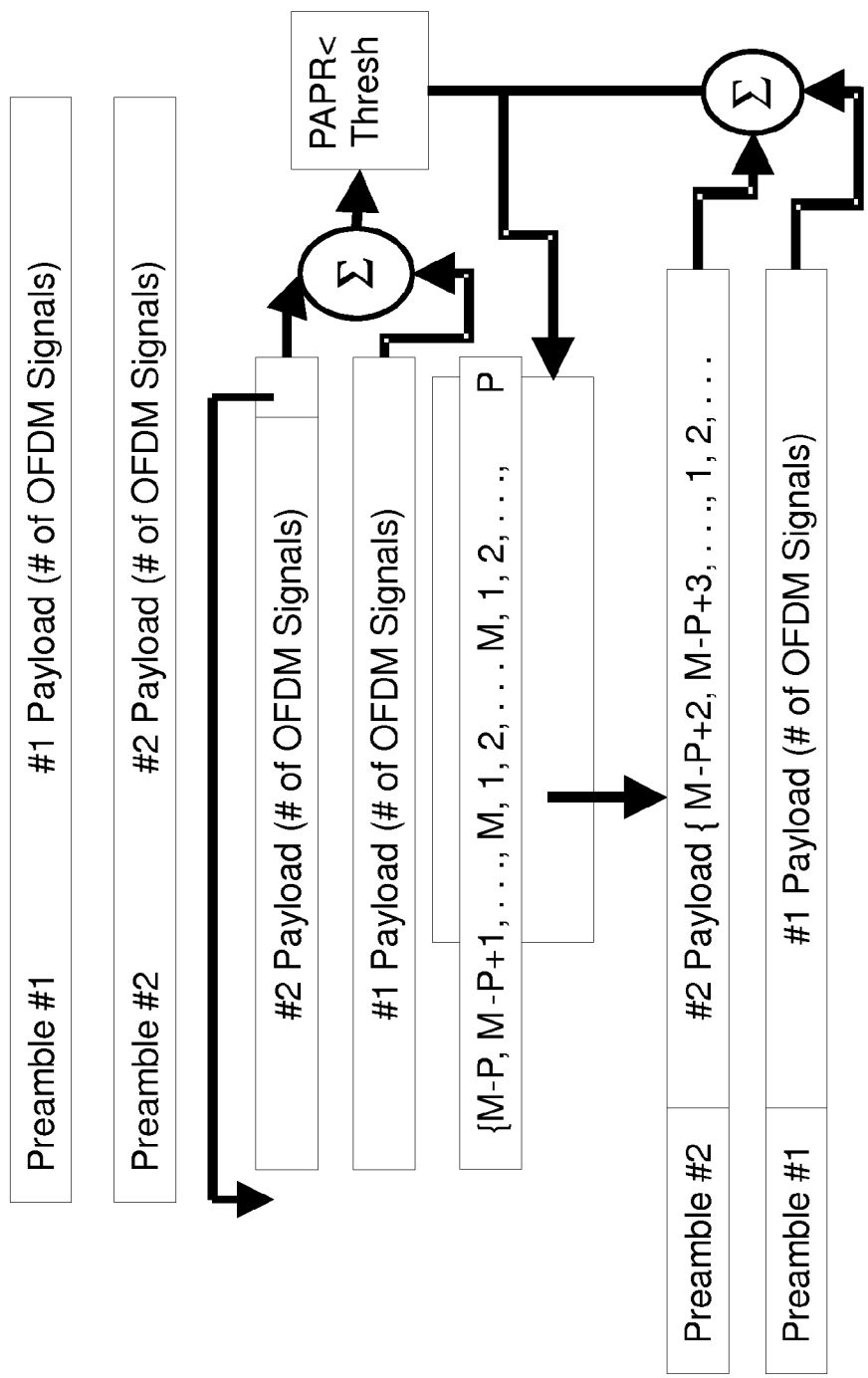
FIG. 4 shows the structure of two OFDM channels, with cyclic shifting of the data for one channel in order to reduce the PAPR.
Figure 5:
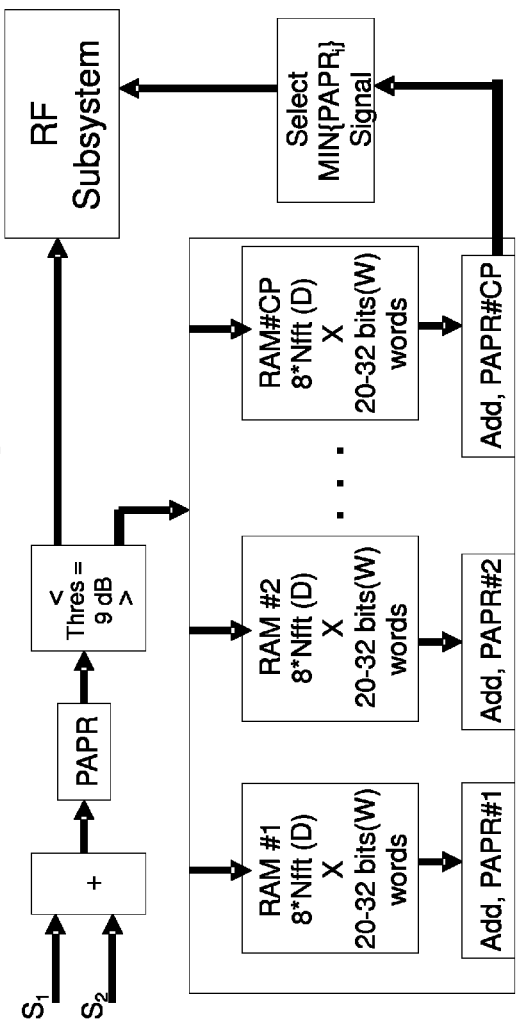
FIG. 5 provides a block diagram showing memory storage of multiple shifted replicas of data from an OFDM channel, with selection of one replica corresponding to minimizing the PAPR.

In a preferred embodiment, the signal combination (including the up-conversion in FIG. 3) is carried out in the digital domain at such an enhanced sampling rate. The PAPR threshold test and CSR control are also implemented at the higher rate. This rate should be fast enough so that multiple iterations can be carried out within a single symbol time (several microseconds).

Figure 6:
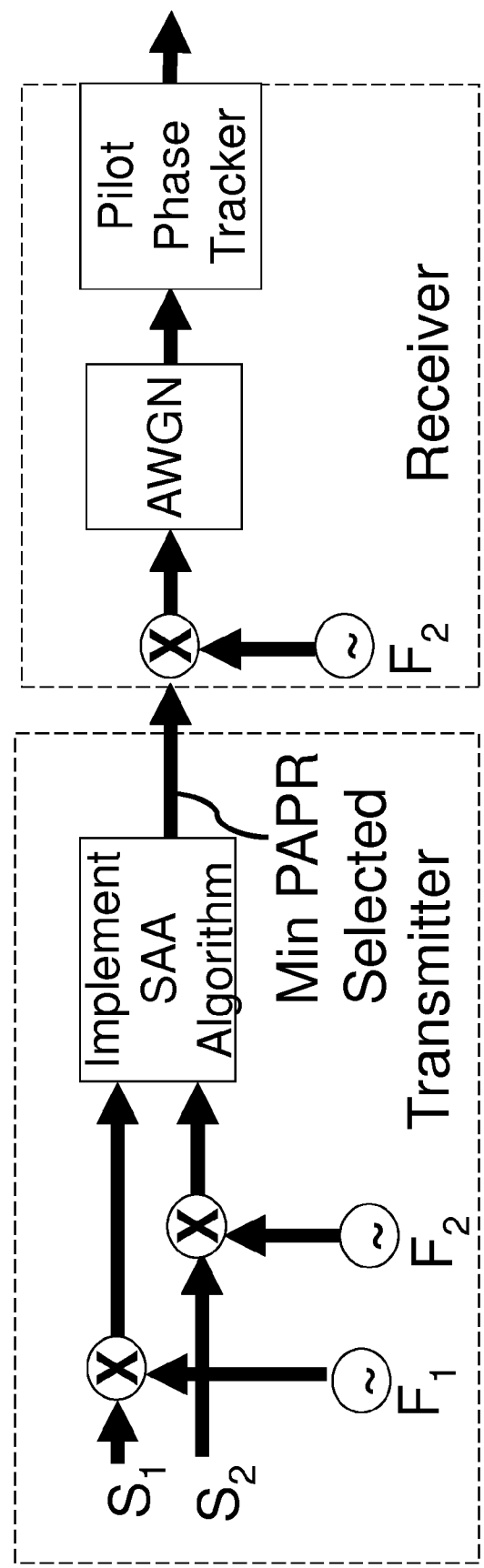
FIG. 6 shows a block diagram of a simulated communication system that incorporates the shift-and-add algorithm in the transmitter.

In order to verify the expectation that the circular time-shift permits reduction in PAPR for combined OFDM channels, without degrading system performance, a full Monte-Carlo simulation of OFDM transmission and reception was carried out. The block diagram of this simulation is summarized in FIG. 6, which represents the "SAA Evaluation Test Bench", and shows a transmitter that combines OFDM signals $S_1$ and $S_2$ at frequencies $F_1$ and $F_2$, subject to the SAA algorithm for PAPR reduction. At the receive end, this is down-converted and the signal at $F_2$ is recovered using a standard OFDM receiver. Along the way, appropriate Additive White Gaussian Noise (AWGN) is added to the channel.

Figure 7:
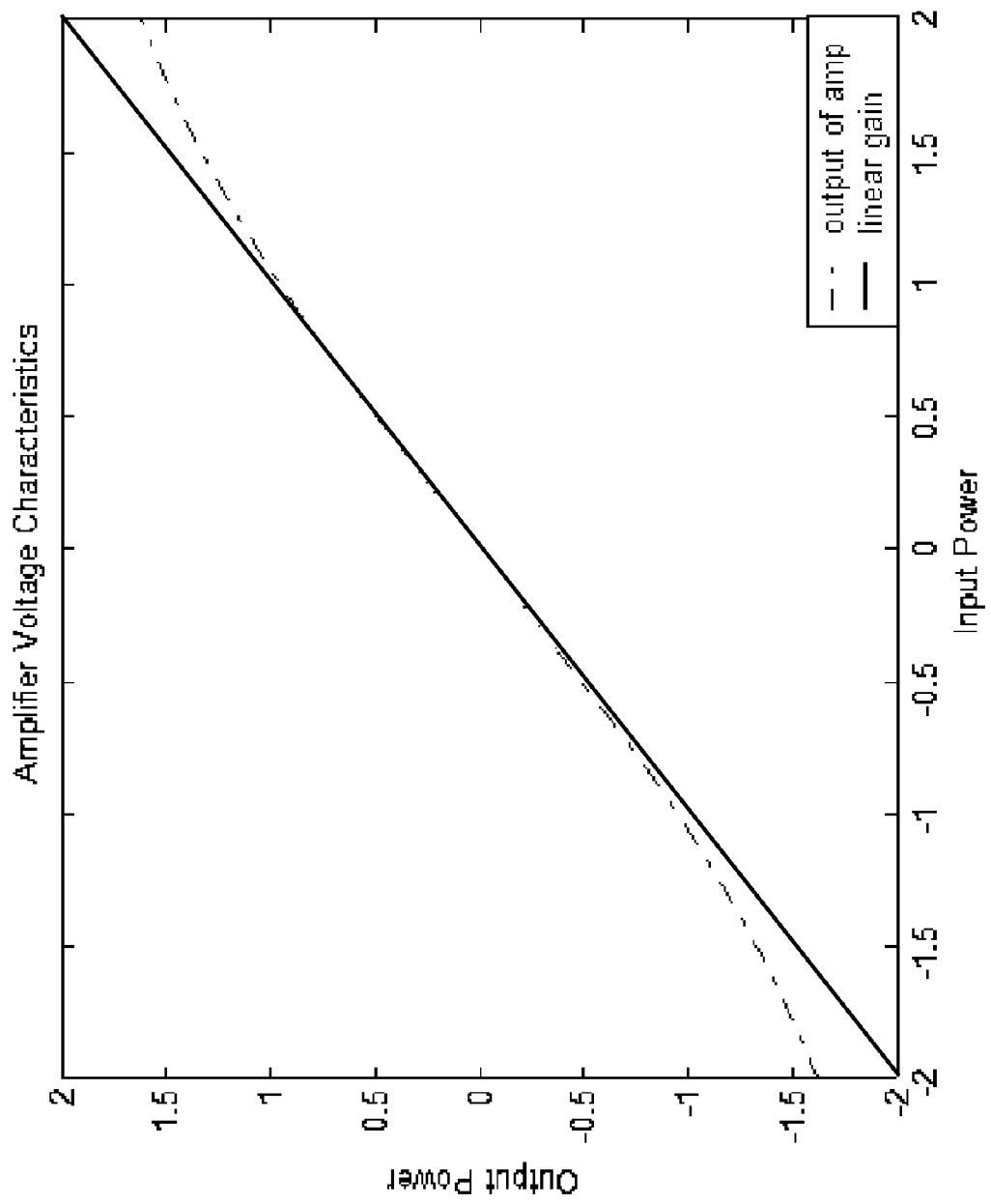
FIG. 7 shows the transfer function of the Power Amplifier included in the transmitter for the simulation shown in FIG. 6.

The simulation also includes a realistic transfer function for an almost-linear Power Amplifier (PA), showing deviation from linearity near saturation (see FIG. 7). The gain factor does not matter for this simulation, so this was not included.

In these simulations, the PAPR of the OFDM signals at F1 and F2 are typically 9-10 dB, and these are then added together to yield a combined signal with a typical PAPR of 12-13 dB. To minimize nonlinear distortion in the transmitted signal, the input power backoff (in dB) for the operation of the transmitter PA is selected to be equal to the PAPR for the combined signal. For each selected value of AWGN, the SNR (in dB) is calculated based on the average powers of the noise and the signal. Then the simulation is run and the bit-error-rate (BER) obtained from the digital signal reconstruction in the OFDM receiver. After application of the SAA, the PAPR is reduced, typically by up to 3 dB, to obtain a modified combined signal with PAPR of 9-10 dB. The input power backoff is then reduced to the new value of the PAPR, and the BER vs. SNR values resimulated.

The parameters for the PAPR bit-error-rate (BER) simulations include the following. Each packet contains 800 bytes of information, which is modulated over several OFDM symbol periods, depending on the modulation type used. Both QPSK (quadrature phase-shift keying) and 16-QAM (16-quadrature amplitude modulation) are examined. Each SNR point is run until 250 packet errors occur. The cyclic prefix is set to ⅛ of the total symbol time. Carriers at frequencies $F_1$ and $F_2$ are spaced sufficiently that their spectra do not overlap. The oversampling rate is a factor of 8. Finally, a raised cosine filter was used, with a very sharp rolloff, with a sampling frequency $F_s$=160 MHz, and a frequency cutoff $F_c$=24 MHz. A PAPR threshold of about 9 dB for the combined OFDM channels was used.

Figure 8:
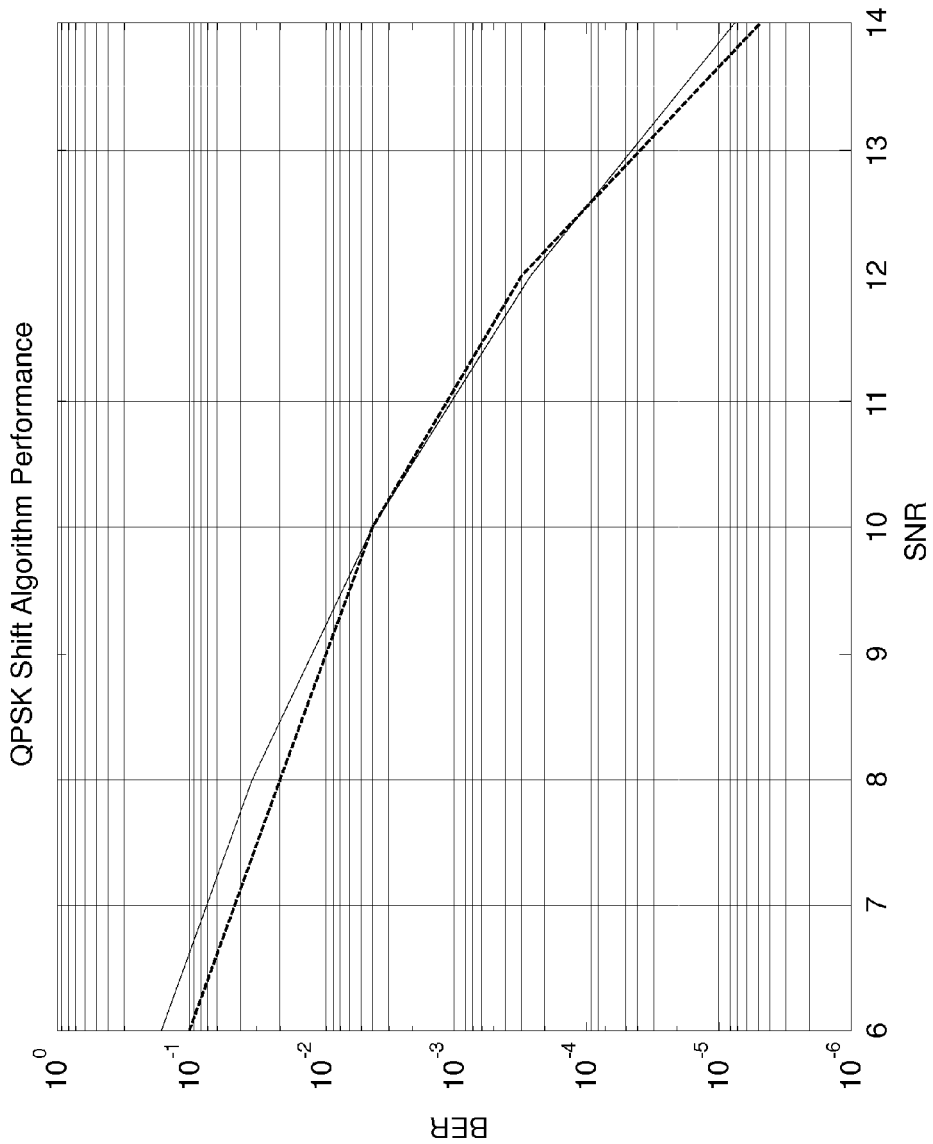
FIG. 8 plots the bit-error rate (BER) for the simulation using quadrature phase-shift keyed (QPSK) OFDM signals, as a function of the signal-to-noise ratio (SNR), with and without the Shift-and-Add algorithm.
Figure 9:
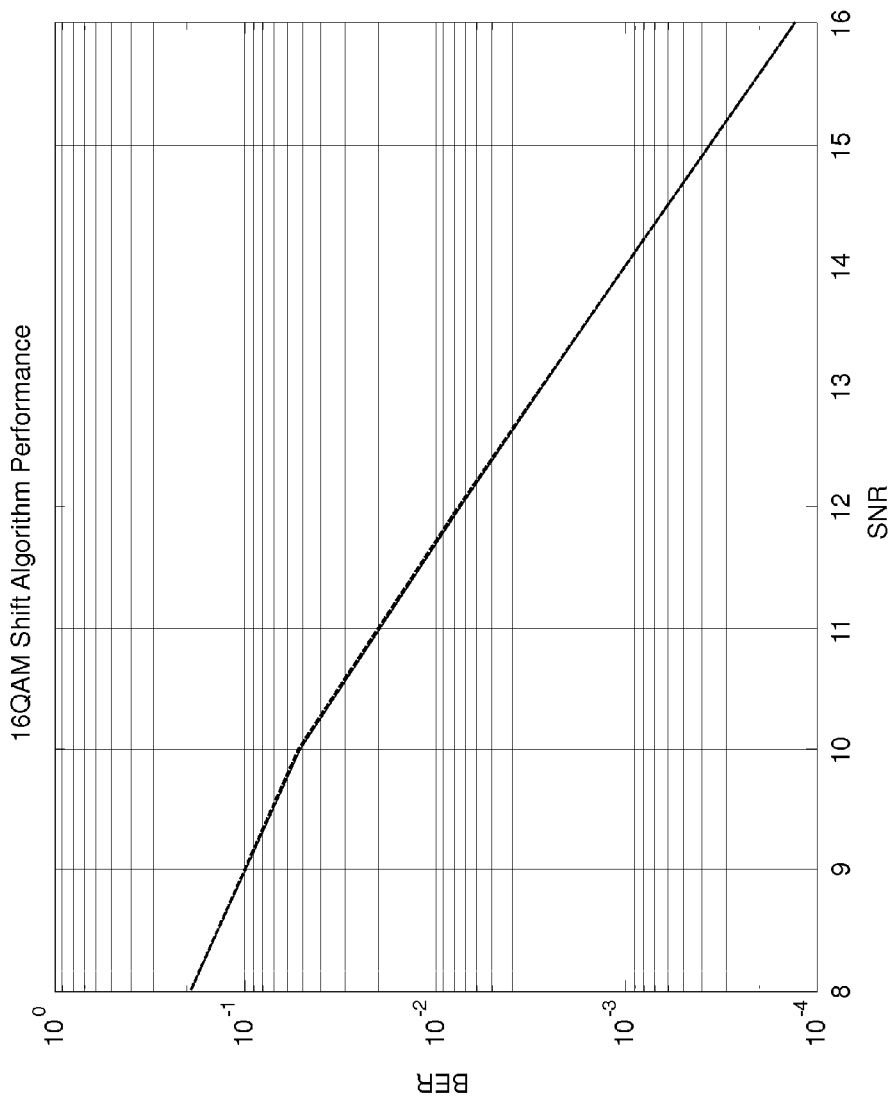
FIG. 9 plots BER using 16-quadrature-amplitude modulated signals (16-QAM) as a function of SNR, with and without the Shift-and-Add algorithm.

FIG. 8 shows the BER performance, as a function signal-to-noise ratio (SNR) (i.e., varying the AWGN power), with and without application of the SAA algorithm, for QPSK modulation. FIG. 9 shows the corresponding analysis for 16-QAM. In both cases, there is very little degradation in BER from zero-shift curves. In FIGS. 8 and 9, the dashed line represents the BER vs. SNR for the combined signal without modification, while the solid line represents the BER vs. SNR for the combined signal after PAPR reduction using SAA. In FIG. 9 for 16QAM, the two lines are virtually indistinguishable. Thus, we have confirmed in these cases that the reduction in PAPR produced by SAA is not accompanied by an increase in signal distortion, and therefore that the SAA improves the system transmission efficiency by the full amount of the PAPR reduction, with no significant degradation in system performance. We further expect similar results (reduction in combined PAPR without signal degradation) to hold for combinations of three or more OFDM signals.

Analyzed quantitatively, the net performance improvement using the SAA is 2.35 dB for QPSK and 2.9 dB for 16-QAM, as inferred from the BER plots. For example, if without SAA, the BER exhibits an error floor of 0.03 at an input backoff (for the PA) of 8.5 dB, whereas the BER exhibits the same error floor with SAA of 6.5 dB, the performance improvement will be 8.5−6.5=2 dB.

These simulations have confirmed not only that the SAA algorithm permits reduction of PAPR in combined OFDM channels by ~3 dB, but also that this reduction is achieved without signal degradation and without the need to send any special side information on the transformations in the transmit signal.

One preferred implementation of the technique involves using a fast field-programmable gate array (FPGA) with blocks for shift-register memories, digital up-conversion, and threshold testing. Alternatively, an ultrafast digital technology, such as rapid-single-flux-quantum (RSFQ) superconducting circuits, may be employed. As the number of OFDM channels being combined is increased, one needs either to increase the algorithm speed, or alternatively carry out a portion of the processing in parallel.

This method may also be applied to a reconfigurable system along the lines of cognitive radio, wherein the channels to be transmitted may be dynamically reassigned depending on user demand and available bandwidth. Both the number of transmitted channels and their frequency allocation may be varied, under full software control. As long as all channels follow the same general symbol protocol and timing, one may apply a similar set of Shift-and-Add algorithms to maintain an acceptable PAPR for efficient transmission.

What is claimed is:

1. A method for controlling a combined waveform, representing a combination of at least two orthogonal frequency division multiplexed signals having orthogonal frequency signal components which occupy different frequency bands, comprising:
   receiving information defining the at least two orthogonal frequency division multiplexed signals which occupy different frequency bands;
   transforming the information defining each respective orthogonal frequency division multiplexed signal to at least one representation having orthogonal frequency signal components, the information defining at least one of the respective orthogonal frequency division multiplexed signals being transformed into at least two alternate representations, each representation being a orthogonal frequency division multiplexed having different orthogonal frequency signal components representing the same information;
   combining the transformed representation of the information of the at least two orthogonal frequency division multiplexed signals each having orthogonal frequency signal components, using the at least two alternate representations, in at least two different ways, to define respectively different combined waveforms of the at least two orthogonal frequency division multiplexed signals which occupy different frequency bands and are not mutually orthogonal with respect to each other, each of the at least two alternate representations representing the same information;
   analyzing the respectively different combined waveforms representing the same information with respect to at least one criterion dependent on the combination;
   selecting a respective one of the at least two alternate respectively different combined waveforms for inclusion in a combination based on said analyzing and
   outputting at least one of:
   (a) information identifying a respective combined waveform,
   (b) information defining the respective combined waveform, and
   (c) information representing a respective combined waveform, based on said selecting.

2. The method according to claim 1, wherein a first respective combined waveform and a second respective combined waveform differ with respect to one of:
   (a) a relative timing of a modulation of the orthogonal frequency signal components of a first signal with respect to a second signal, and (b) a relative phase of the orthogonal frequency signal components of a orthogonal frequency division multiplexed signal.

3. The method according claim 1, wherein the at least one criterion comprises a peak to average power ratio (PAPR), and wherein at least one orthogonal frequency division multiplexed signal is an orthogonal frequency division multiplexed stream which is compatible with at least one protocol selected from the group of an IEEE 802.11 protocol, an IEEE 802.16 protocol, a DAB protocol and a DVB protocol, wherein a receiver compliant with the at least one protocol can demodulate the at least two respectively different respective combined waveforms without requiring additional information to be transmitted outside of said protocol.

4. The method according to claim 1, wherein the at least two alternate respectively different combined waveforms differ respectively in a cyclic time shift in a modulation sequence comprising the entirety of the information defining a respective orthogonal frequency division multiplexed signal representation having orthogonal frequency signal components, and the at least one criterion comprises a peak to average power ratio (PAPR), wherein an alternate respective combined waveform which results in a lowest peak to average power ratio is selected for combination.

5. The method according to claim 1, wherein said analyzing comprises analyzing a clipping distortion of the respective combined waveform in a model of an amplifier.

6. The method according to claim 1, wherein said outputting comprises outputting the selected respective combined waveform as a direct conversion from a digital representation of the respective combined waveform to a radio frequency analog signal adapted for transmission without frequency modification.

7. The method according to claim 1, further comprising predistorting at least one of an intermediate frequency and a radio frequency representation of the selected respective combined waveform.

8. The method according to claim 7, wherein the predistorting compensates for at least a portion of one or more of an analog non-linearity, a non-linear distortion of a power amplifier which amplifies the selected respective combined waveform, a transmission channel impairment, and a receiver characteristic of an analog radio communication system communicating using the selected respective combined waveform.

9. The method according to claim 1, wherein each representation of the at least two orthogonal frequency division multiplexed signals having orthogonal frequency signal components of the same information comprises an orthogonal frequency domain multiplexed signal having a cyclic prefix, and wherein the two alternate respective combined waveforms differ in a respective cyclic time shift of the entire orthogonal frequency domain multiplexed signal having a cyclic prefix.

10. The method according to claim 1, wherein each of the at least two orthogonal frequency division multiplexed signals is received as an orthogonal frequency division multiplexed signal having a cyclic prefix, at least one of the signals is modified to generate the at least two alternate respective combined waveforms which differ with respect to at least one of:
  (a) a relative timing of a modulation of all of the frequency components of a first orthogonal frequency division multiplexed signal with respect to a second orthogonal frequency division multiplexed signal, and
  (b) a relative phase of all of the orthogonal frequency signal components, and
  the at least one criterion comprises a peak to average power ratio of the combined signal,
  wherein the selected respective combined waveform is a respective combined waveform representing a lowest peak to average power ratio.

11. An apparatus for combining a plurality of orthogonal frequency division multiplexed signals, each orthogonal frequency division multiplexed signal comprising a set of phase and/or amplitude modulated orthogonal frequency components within a respective different frequency band communication channel which are not mutually orthogonal with respect to each other, comprising:
  at least one automated processor configured to:
    receive information defining each of the plurality of orthogonal frequency division multiplexed signals,
    represent the received information defining each of the plurality of orthogonal frequency division multiplexed signals as a respective plurality of orthogonal frequency signal components which are not mutually orthogonal with respect to each other, wherein the information defining at least one of the plurality of orthogonal frequency division multiplexed signals is represented as a plurality of alternate sets of orthogonal frequency signal components together defining the same received information,
    analyze with respect to at least one fitness criterion a plurality of different combinations of the respective plurality of orthogonal frequency signals, each respective different combination representing the plurality of orthogonal frequency division multiplexed signals in the respective different frequency band communication channels which are not mutually orthogonal with respect to each other, and each comprising one of the plurality of respectively alternate sets of orthogonal frequency signal components, and
    select a respective one of the different combinations based on the analysis; and
  an output port configured to present the selected combination.

12. The apparatus according to claim 11, wherein a first combination and a second combination of the transformed information differ with respect to one of (a) a relative timing of a modulation of all of the orthogonal frequency components of a first orthogonal frequency division multiplexed signal with respect to a second orthogonal frequency division multiplexed signal and (b) a relative phase of all of the orthogonal frequency components of a orthogonal frequency division multiplexed signal, and the at least one criterion comprises a peak to average power ratio (PAPR).

13. The apparatus according to claim 11, wherein at least one of the plurality of orthogonal frequency division multiplexed signals is compatible with at least one protocol selected from the group of an IEEE 802.11 protocol, an IEEE 802.16 protocol, a DAB protocol and a DVB protocol, wherein a receiver compliant with the at least one protocol can demodulate each of the plurality of alternate sets of orthogonal frequency signal components of the at least one of the plurality of orthogonal frequency division multiplexed signals without requiring additional information to be transmitted outside of said protocol.

14. The apparatus according to claim 11, wherein the plurality of alternate sets of orthogonal frequency signal components of the at least one of the plurality of orthogonal frequency division multiplexed signals differ respectively in a cyclic time shift in a modulation sequence, and the at least one criterion comprises a peak to average power ratio (PAPR), wherein an alternate representation which results in a lowest peak to average power ratio is selected for combination.

15. The apparatus according to claim 11, wherein the output port is configured to output a direct conversion from a digital representation of the combined signal to a radio frequency analog signal adapted for transmission without frequency modification.

16. The apparatus according to claim 11, wherein the at least one automated processor is further configured to predistort at least one of an intermediate frequency and a radio frequency representation of the selected combination.

17. The apparatus according to claim 16, wherein the predistortion compensates for at least a portion of one or more of an analog non-linearity, a non-linear distortion of a power amplifier which is configured to amplify the selected combination, a transmission channel impairment, and a receiver characteristic of an analog radio communication system communicating using the selected combination.

18. The apparatus according to claim 11, wherein each of the plurality of orthogonal frequency division multiplexed signals conforms to a communications protocol, the plurality of alternate sets of orthogonal frequency signal components of the at least one of the plurality of orthogonal frequency division multiplexed signals are each adapted to be demodulated by a receiver compatible with the protocol without requiring receipt of additional information outside of the communications protocol, and the at least one criterion comprises a peak to average power ratio of the respective combination, wherein the selected respective combination is a combined signal representing a lowest peak to average power ratio.

19. The apparatus according to claim 11, wherein the at least one automated processor is further configured to analyze a nonlinear distortion of each respective combination in a model of an amplifier, and further to predistort at least one component of the selected combination.

20. An apparatus for combining a plurality of orthogonal frequency division multiplexed signals occupying different frequency channels and which are not mutually orthogonal, comprising:
  an input port configured to receive information defining the plurality of orthogonal frequency division multiplexed signals;
  a processor configured to:
  represent the received information defining at least one of the plurality of orthogonal frequency division multiplexed signals as at least two alternate sets of respective plurality of orthogonal frequency signal components together defining the same received information,
  analyze a plurality of respective different combinations of the plurality of orthogonal frequency division multiplexed signals occupying different frequency channels and which are not mutually orthogonal, each respective different combination comprising one of the at least two alternate sets of respective plurality of orthogonal frequency signal components, with respect to at least one fitness criterion, and
  select a respective one of the plurality of respective different combinations of the plurality of orthogonal frequency division multiplexed signals occupying different frequency channels and which are not mutually orthogonal, based on the analysis; and
  an output port configured to present the selected respective one of the plurality of respective different combinations of the plurality of orthogonal frequency division multiplexed signals occupying different frequency channels and which are not mutually orthogonal.

* * * * *